(12) United States Patent
Minato et al.

(10) Patent No.: US 8,732,312 B2
(45) Date of Patent: May 20, 2014

(54) COMPUTING SYSTEM AND COMPUTING SYSTEM MANAGEMENT METHOD

(75) Inventors: Takayuki Minato, Kawasaki (JP);
Masahisa Nakano, Kawasaki (JP);
Naoto Takahashi, Kawasaki (JP);
Michiyuki Mizutani, Kawasaki (JP);
Tsuyoshi Nagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 13/305,891

(22) Filed: Nov. 29, 2011

(65) Prior Publication Data

US 2012/0137006 A1  May 31, 2012

(30) Foreign Application Priority Data

Nov. 30, 2010  (JP) ................................. 2010-267658

(51) Int. Cl.
*G06F 15/173* (2006.01)
*G06F 9/50* (2006.01)
(52) U.S. Cl.
CPC .................................. *G06F 9/5083* (2013.01)
USPC ........................................ 709/226; 709/223
(58) Field of Classification Search
CPC ................................................... G06F 9/5083
USPC ................................................. 709/206, 226
See application file for complete search history.

(56) References Cited

U.S. PATENT DOCUMENTS

| | | | |
|---|---|---|---|
| 6,502,109 B1 | 12/2002 | Aravamudan et al. | |
| 7,124,134 B2 * | 10/2006 | Buzzeo et al. | ......................... 1/1 |
| 7,475,184 B2 * | 1/2009 | Lee | ............................... 711/103 |
| 2003/0144894 A1 * | 7/2003 | Robertson et al. | ................ 705/8 |
| 2006/0053246 A1 * | 3/2006 | Lee | ................................ 711/100 |
| 2006/0209695 A1 * | 9/2006 | Archer et al. | ................. 370/235 |
| 2006/0248212 A1 * | 11/2006 | Sherer et al. | ................... 709/231 |
| 2007/0174691 A1 * | 7/2007 | D'Souza et al. | ................ 714/13 |
| 2007/0174836 A1 | 7/2007 | Ito et al. | |
| 2007/0288532 A1 * | 12/2007 | Yamazaki et al. | ............ 707/203 |
| 2008/0235533 A1 * | 9/2008 | Hatasaki et al. | ................... 714/4 |
| 2009/0006527 A1 * | 1/2009 | Gingell et al. | ................ 709/202 |
| 2009/0177775 A1 * | 7/2009 | Radia et al. | ................... 709/226 |
| 2009/0271478 A1 * | 10/2009 | Imai | ............................. 709/203 |
| 2011/0099259 A1 * | 4/2011 | Lyon | ............................ 709/223 |

FOREIGN PATENT DOCUMENTS

| | | |
|---|---|---|
| JP | 8-27784 B | 3/1996 |
| JP | 2000-222376 A | 8/2000 |
| JP | 2001-202284 A | 7/2001 |
| JP | 2003-178041 A | 6/2003 |
| JP | 2007-199829 A | 8/2007 |
| JP | 2007-226399 A | 9/2007 |
| JP | 2007-328413 A | 12/2007 |

* cited by examiner

*Primary Examiner* — Gerald Smarth
(74) *Attorney, Agent, or Firm* — Fujitsu Patent Center

(57) ABSTRACT

A computing system includes: a plurality of computing machines and a load balancer configured to allocate computing processing to the plurality of computing machines. In the computing system, the plurality of computing machines executes the computing processing, each of the plurality of computing machines includes an execution instruction unit that instructs to execute one of garbage collection (GC) and restart of the computing machine. The computing machine, in an active state in which the computing processing is allowed to be executed, switches a state of another standby computing machine to an active state when the active computing machine is instructed to execute one of the GC and the restart of the computing machine, and starts one of the GC and the restart of the computing machine after the switching is completed.

4 Claims, 26 Drawing Sheets

FIG. 2
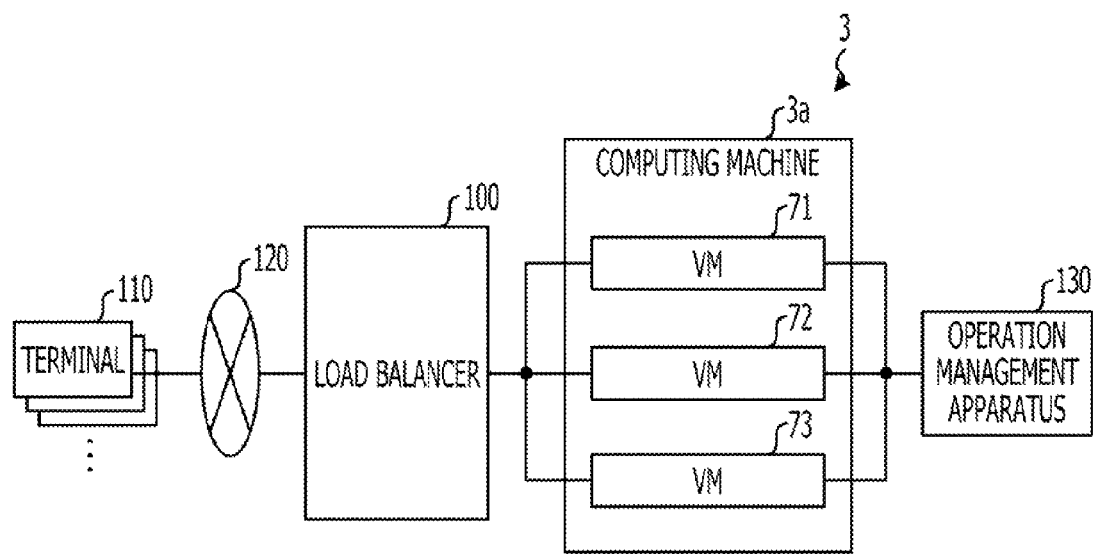
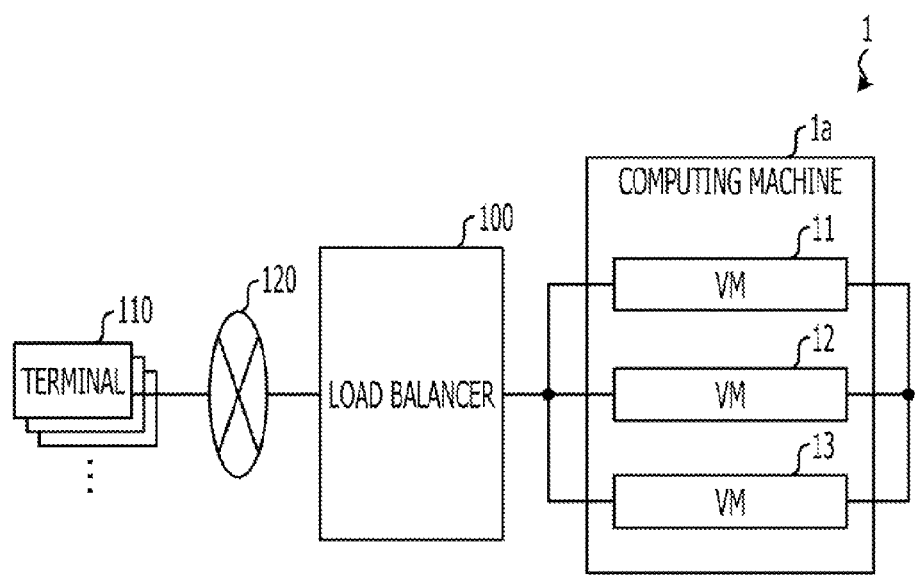

FIG. 4

| INFORMATION NAME (LARGE CLASSIFICATION) | INFORMATION NAME (MIDDLE CLASSIFICATION) | INFORMATION NAME (SMALL CLASSIFICATION) | VALUE | OTHERS |
|---|---|---|---|---|
| LOAD BALANCER | HOST | | 192.168.100.1 | ... |
| ↑ | PORT | | 12220 | ... |
| BROADCAST WHEN STATUS IS DETECTED | BROADCAST INTERVAL | | 5 SECONDS | ... |
| STATUS MONITORING | MONITORING INTERVAL | | 1 SECOND | ... |
| ↑ | RESPONSE TIMEOUT | | 480 SECONDS | ... |
| ↑ | MEMORY REGION A | THRESHOLD VALUE 1 | 60% | ... |
| ↑ | ↑ | REMEDIAL MEASURE 1 | FORCED RESTART | ... |
| ↑ | ↑ | THRESHOLD VALUE 1 | 85% | ... |
| ↑ | ↑ | REMEDIAL MEASURE 1 | RESET AFTER SWITCHING | ... |
| ↑ | ↑ | THRESHOLD VALUE 2 | | ... |
| ↑ | ↑ | REMEDIAL MEASURE 2 | FORCED RESET | ... |
| ↑ | MEMORY REGION B | THRESHOLD VALUE 1 | 80% | ... |
| ↑ | ↑ | REMEDIAL MEASURE 1 | RESTART AFTER SWITCHING | ... |
| ↑ | ↑ | THRESHOLD VALUE 2 | 90% | ... |
| ↑ | ↑ | REMEDIAL MEASURE 2 | FORCED RESTART | ... |

ONE OR MORE SETS OF THRESHOLD VALUE AND REMEDIAL MEASURE ARE PREPARED. WHEN DATA REACHES THRESHOLD VALUE, CORRESPONDING REMEDIAL MEASURE IS EXECUTED.

FIG. 5

| TYPE OF REMEDIAL MEASURES | PRIORITY LEVEL |
|---|---|
| FORCED TERMINATION | 1 |
| TERMINATION AFTER SWITCHING | 2 |
| FORCED RESTART | 3 |
| RESTART AFTER SWITCHING | 4 |
| FORCED RESET | 5 |
| RESET AFTER SWITCHING | 6 |

TABLE WHEN OPERATION STARTS

| NO. | MACHINE NAME | PROTOCOL | HOST NAME/IP ADDRESS | PORT NUMBER | OTHERS |
|---|---|---|---|---|---|
| 1 | A | JMX-SNMP | app1.fu.com | 162 | ⋮ |
| 2 | B | JMX-RMI | app2.fu.com | 2001 | ⋮ |
| 3 | ⋮ | ⋮ | ⋮ | ⋮ | ⋮ |

⇩ VMS ARE ADDED

TABLE AFTER VMS ARE ADDED

| NO. | MACHINE NAME | PROTOCOL | HOST NAME/IP ADDRESS | PORT NUMBER | OTHERS |
|---|---|---|---|---|---|
| 1 | A | JMX-SNMP | app1.fu.com | 162 | ⋮ |
| 2 | B | JMX-RMI | app2.fu.com | 2001 | ⋮ |
| 3 | C | JMX-RMI | app3.fu.com | 2002 | ⋮ |
| 4 | D | JMX-RMI | app4.fu.com | 2003 | ⋮ |
| 5 | ⋮ | ⋮ | ⋮ | ⋮ | ⋮ |

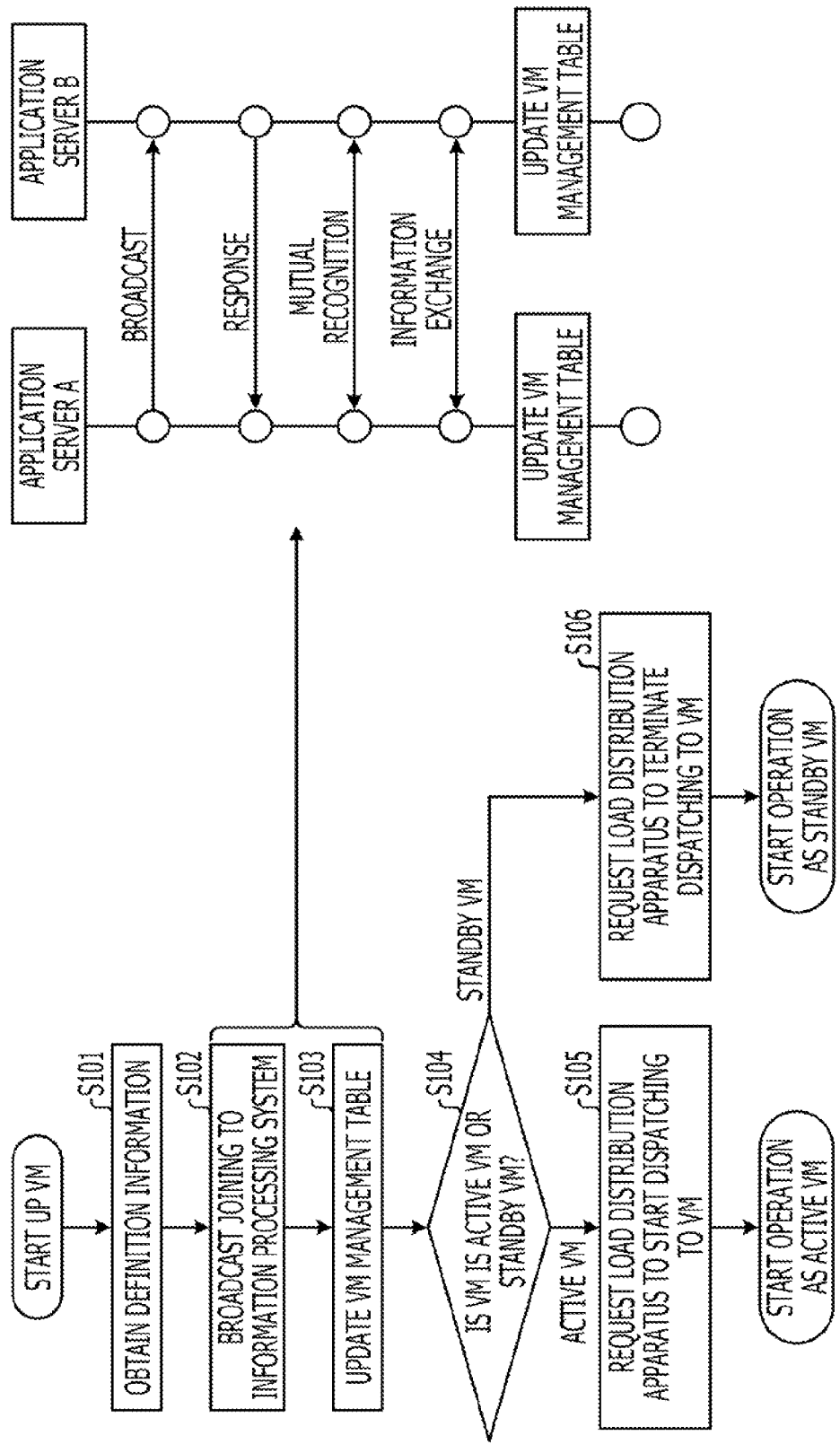

FIG. 21

HASH MAP < VM IDENTIFIER, TARGET OBJECT >

| VM IDENTIFIER | HOLD OBJECT |
|---|---|
| VM 1 | JavaBeans 1_1 |
| VM 2 | JavaBeans 1_2 |
| VM 3 | JavaBeans 1_3 |

JAVA BEANS 1_1

| VM IDENTIFIER | NUMBER OF ACTIVE PROCESSES | TYPE | NUMBER OF STANDBY PROCESSES | MAP OBJECT |
|---|---|---|---|---|
| VIRTUAL COMPUTER 1 | 3 | WEB/EJB | 1 | JavaBeans 2_1 |

JAVA BEANS 2_1

| PROCESS SEQUENCE NUMBER | JMX PORT NUMBER | PROCESS ID | WEB PORT NUMBER | STATE | FULL GC FLAG |
|---|---|---|---|---|---|
| 1 | 20001 | 29358 | 8421 | ACTIVE | FALSE |
| 2 | 20002 | 29359 | 8422 | ACTIVE | FALSE |
| 3 | 20003 | 29361 | 8423 | STANDBY | FALSE |

COMPUTING SYSTEM AND COMPUTING SYSTEM MANAGEMENT METHOD

CROSS-REFERENCE TO RELATED APPLICATIONS

This application is based upon and claims priority to Japanese Patent Application No. 2010-267658 filed on Nov. 30, 2010 in the Japan Patent Office, the entire contents of which are incorporated herein by reference.

FIELD

Embodiments discussed herein relate to a computing system and a computing system management method.

BACKGROUND

In an application server in which a Java (registered trademark) application operates, a garbage collection (GC) function is used in which a Java virtual machine (VM) automatically frees up an area no longer in use from among memory areas dynamically reclaimed by the Java application. Full GC is GC that frees up both a memory area (heap area) in which Java is allowed to be used and a non-heap area.

In a technology of conventional GC, there is a technology for predicting an overhead of Full GC, etc and executing overhead avoidance. In this case, during execution of the overhead avoidance, processing is allocated to another application server (for example, Japanese Unexamined Patent Application Publication No. 2003-178041). In addition, there is also a technology for executing Full GC sequentially by preparing a standby VM (for example, Japanese Unexamined Patent Application Publication No. 2007-199829).

In addition, there is a technology for invoking a reset processing execution unit in a system at a time set in a reset processing period setting table, and invoking blocking release processing after blocking processing and Full GC processing is executed. In addition, there is also a technology for executing GC of memory referred to by processing of a processing program, measuring a time in which the GC is executed, calculating an interval between previously executed GC processing and currently executed GC processing based on the measuring result, and determining whether to notify the occurrence of abnormality based on the result obtained by comparing the calculated interval and a certain threshold value (For example, Japanese Unexamined Patent Application Publication No. 2007-226399). In such example, a threshold value, and the interval of Full GC or a memory amount increased by the Full GC in a system are checked, and an alert is notified.

SUMMARY

According to an aspect of the invention, a computing system includes: a plurality of computing machines and a load balancer configured to allocate computing processing to the plurality of computing machines. In the computing system, the plurality of computing machines executes the computing processing, each of the plurality of computing machines includes an execution instruction unit that instructs to execute one of garbage collection (GC) and restart of the computing machine. The computing machine, in an active state in which the computing processing is allowed to be executed, switches a state of another standby computing machine to an active state when the active computing machine is instructed to execute one of the GC and the restart of the computing machine, and starts one of the GC and the restart of the computing machine after the switching is completed.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a contrast between the computing system according to the first embodiment and a computing system according to a conventional technology;
FIG. 4 illustrates definition information 56 in FIG. 1;
FIG. 5 illustrates examples of priority levels of recovery processing;
FIG. 7 illustrates startup processing and mutual recognition processing of a VM;
FIG. 21 illustrates an example of data stored in a VM information storage unit.

DESCRIPTION OF EMBODIMENTS

Figure 1:
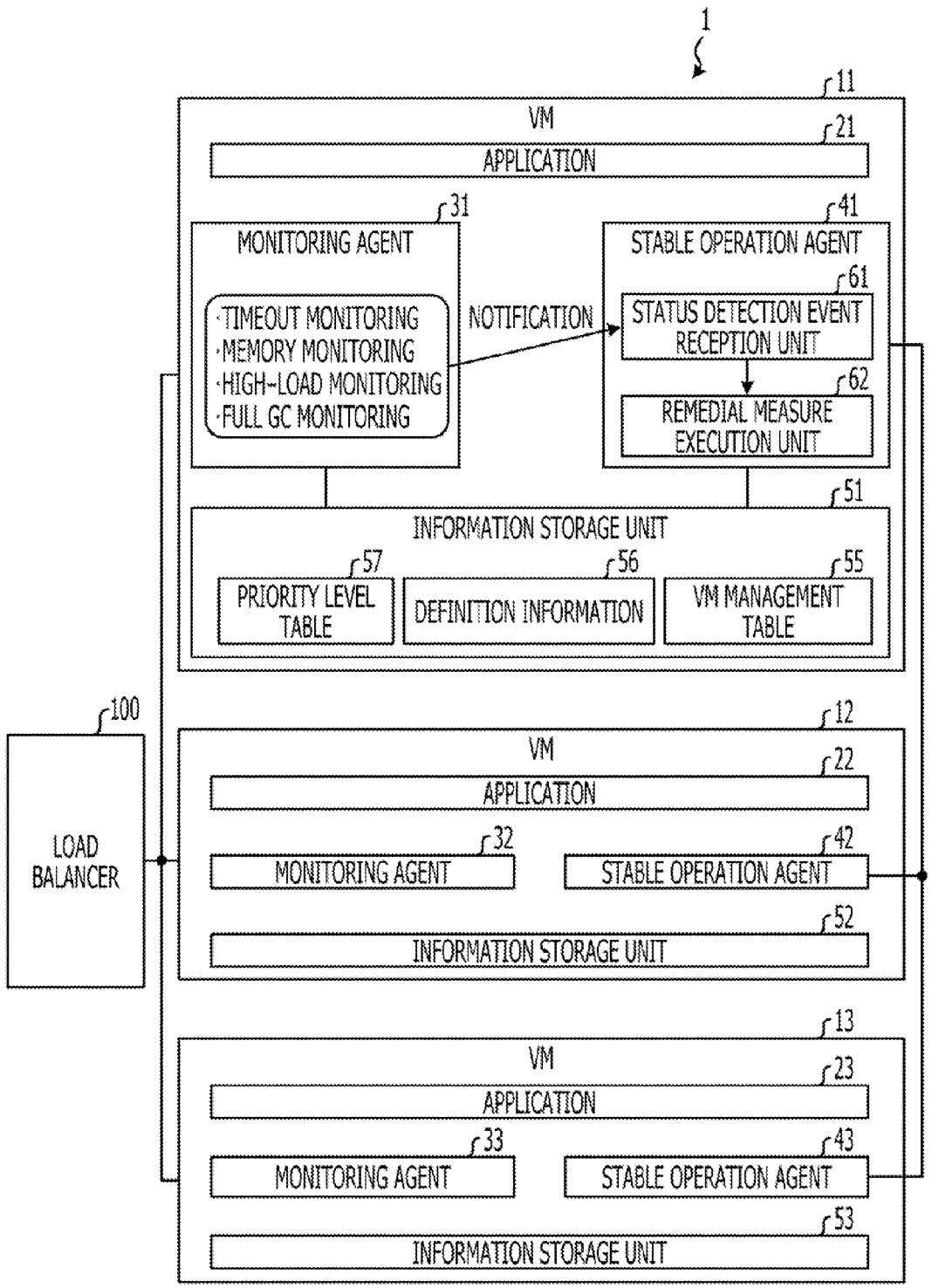
FIG. 1 illustrates a configuration of a computing system according to a first embodiment.

In a conventional technology, when load balancer is executed so that two or more application servers have substantially the same amount of load, processing efficiency of a whole system is undesirably reduced due to the occurrence of Full GC caused by an increase in memory usage in an amount of the other two or more VMs during the execution of overhead avoidance.

In addition, when a load balancer that is an external device predicts an overhead of the application server, input/output (IO) processing through a network is desired. As a result, the performance of the application server is undesirably reduced due to the IO processing, and it may be difficult to achieve monitoring in the system with high accuracy.

In addition, the maintenance of the load balancer is desired when the specification and implementation of the application server are changed or scaled up because the load balancer is desired to have a function to predict an overhead of the application server.

In addition, when the load balancer is executed so that the two or more application servers have substantially the same load, a memory usage amount of the VM increases while memory usage amounts of the other VMs increase. In addition, recently, a VM having a large memory space has been used commonly, and a Full GC processing time period has increased, so that a desired time period for sequential Full GC processing has increased. Thus, in a system in which Full GC processing is sequentially executed, in a VM having lower priority of Full GC processing to be executed, a memory usage amount increases undesirably before the Full GC processing is executed, and the Full GC occurs without executing blocking processing. As a result, normal failover may not be achieved, and the processing efficiency of the whole system is undesirably reduced.

In addition, in a conventional Java application, or in the case where an application operates in an application server system for starting up the processes of Java, when there is a shortage of available heap amount, and when GC as a Java standard feature is executed, application processing capability is undesirably reduced in a time period proportional to the whole heap amount, thereby reducing a throughput for requests.

In a technology for automatically executing Full GC based on a time of day, requests may exist at a specified time of day. When an overload state is prolonged or when an overload state occurs in two or more time periods, two or more courses of Full GC processing may be undesirably required in a day. In such a case, at least the throughput is undesirably reduced due to the occurrence of requests.

In addition, in a technology for automatically executing Full GC, when a memory usage amount increases during the service operation, and a remaining heap amount falls below a set threshold value set, the processing performance is significantly reduced in a Java VM in which Full GC operates, thereby having an effect on the service operation undesirably.

A computing system and a computing system management method according to embodiments are described in detail with reference to drawings. The technology described below is not limited to the embodiments.

First Embodiment

Configuration of a Computing System

FIG. 1 illustrates a configuration of a computing system according to a first embodiment. A computing system 1 illustrated in FIG. 1 is configured to couple a load balancer 100 to each of VMs 11 to 13. In addition, the VMs 11 to 13 may communicate with each other.

Each of the VMs 11 to 13 is a VM that operates in an operating system, and two or more VMs may be executed in the operating system. That is, each of the VMs may not execute computing processing on an emulation program of a computer, however, may execute the computing processing as a computing application on a single operating system.

A VM 11 includes an application 21, a monitoring agent 31, a stable operation agent 41, and a data storage unit 51. The application 21 is an application for executing computing processing allocated from the load balancer 100. The monitoring agent 31 functions as an execution instruction unit that monitors operations in the VM 11 and instructs the execution of GC in the VM 11 based on the monitoring result.

For example, the monitoring agent 31 monitors a timeout generated in the VM 11, memory usage of the VM 11, load status, and generation of a Full GC request from the outside. In addition, the monitoring agent 31 notifies the stable operation agent 41 of the monitoring result as a status detection event.

The stable operation agent 41 includes a status detection event reception unit 61 that receives a status detection event from the monitoring agent 31 and a recovery processing execution unit 62 that executes a recovery processing based on the received event. When an execution of GC, termination of a computing machine, or restart of a computing machine is instructed, the stable operation agent 41 switches a state of another standby VM into an active state in which computing processing may be executed. In addition, after switching the state, the stable operation agent 41 operates as a stable operation processing unit that executes the GC, termination of a computing machine, or restart of the computing machine.

The data storage unit 51 is a storage unit that stores various information used in the VM 11 such as definition information 56, a VM management table 55, and a priority level table 57.

Similarly to the VM 11, a VM 12 includes an application 22, a monitoring agent 32, a stable operation agent 42, and a data storage unit 52. In addition, a VM 13 includes an application 23, a monitoring agent 33, a stable operation agent 43, and a data storage unit 53. The applications 22 and 23 operate similarly to the application 21, and the monitoring agents 32 and 33 operate similarly to the monitoring agent 31. In addition, the stable operation agents 42 and 43 operate similarly to the stable operation agent 41, and the data storage units 52 and 53 operate similarly to the data storage unit 51.

FIG. 2 illustrates a contrast between the computing system according to the first embodiment and a computing system according to a conventional technology (Japanese Unexamined Patent Application Publication No. 2007-199829). As illustrated in FIG. 2, in the computing system 1, the VMs 11 to 13 are executed in a computing machine 1a, and the computing machine 1a is coupled to the load balancer 100. In addition, the load balancer 100 is coupled to a terminal group 110 through a network 120.

In addition, in a computing system 3 as a comparative example of the computing system 1, VMs 71 to 73 are executed in a computing machine 3A, and the computing machine 3A is coupled to the load balancer 100. In addition, the load balancer 100 and the computing machine 3A are coupled to an operation management apparatus 130. In addition, the load balancer 100 is coupled to the terminal group 110 through the network 120.

In the computing system 3, when a VM is added, settings are undesirably made for the whole system including an operation management apparatus. On the other hand, in the computing system 1 according to the first embodiment, VMs communicate with each other without an operation management apparatus. As described above, the computing system 1 does not include an operation management apparatus, thereby reducing workload for the maintenance.

Figure 3:
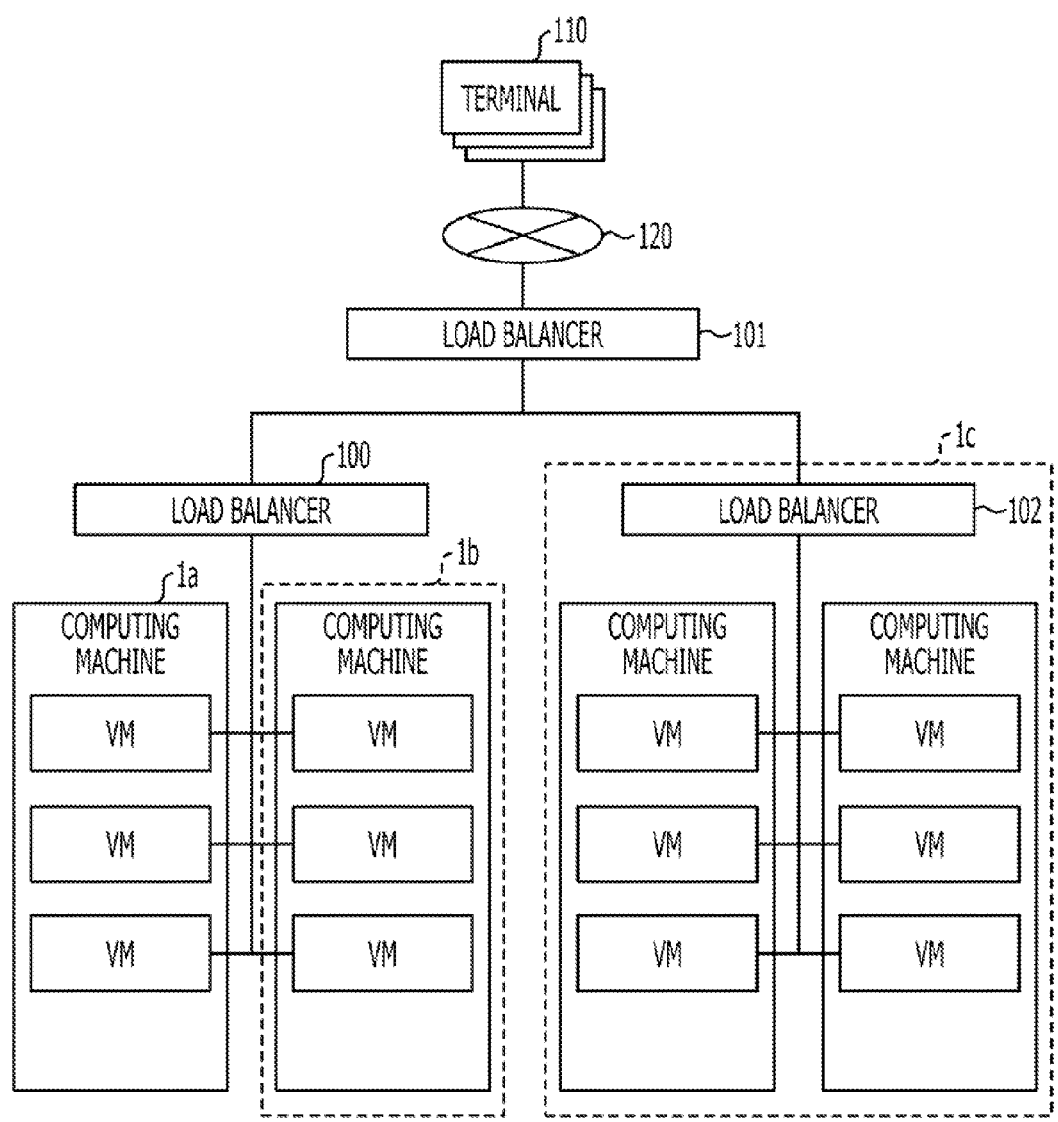
FIG. 3 illustrates an additional installation of VMs in the computing system 1.

FIG. 3 illustrates an additional installation of VMs in the computing system 1. In the example illustrated in FIG. 3, the load balancer 100 is coupled to the computing machine 1a, and the load balancer 100 is also coupled to the load balancer 101. The load balancer 101 is coupled to the terminal group 110 through the network 120.

In such a configuration, a computing machine 1b may be also added to the load balancer 100. In such a case, the addition is executed without a load balancer. In addition, a computing system 1c including the load balancer 102 may be also added to the load balancer 100. As described above, the system including the load balancer 100 may be added to the computing system 1.

The computing system 3 as the comparative example of the computing system 1 is configured to include a single load balancer because an operation management apparatus is configured to communicate with a certain load balancer. On the other hand, the computing system 1 according to the first embodiment, each of the VMs communicates with the load balancer directly, so that a system including a load balancer may be added to the computing system 1.

[Example of Data]

FIG. 4 illustrates the definition information 56 illustrated in FIG. 1. In the definition information 56, a threshold value of a monitoring data and a recovery processing obtained when the data reaches the threshold value are set. In the definition information 56, information is obtained from a definition file and the whole of the system, and the information is managed so as to be held in a memory.

In the example illustrated in FIG. 4, the definition information 56 includes items such as information name of large classification, information name of middle classification, information name of small classification, value, and others. Value "192.168.100.1" is defined in the information name of large classification as "load balancer" and the information name of middle classification as "host". In addition, value "12220" is defined in the information name of large classification as "load balancer" and the information name of middle classification as "port".

Similarly, value "5 seconds" is defined in the information name of large classification as "broadcast when a status is detected" and the information name of middle classification as "broadcast interval". In addition, value "1 second" is defined in the information name of large classification as "status monitoring" and the information name of middle classification as "monitoring interval".

Similarly, value "480 seconds" is defined in the information name of large classification as "status monitoring", the information name of middle classification as "response timeout", and the information name of small classification as "threshold value 1". In addition, value "forced restart" is defined in the information name of large classification as "status monitoring", the information name of middle classification as "response timeout", and the information name of small classification as "recovery processing 1".

Similarly, value "60%" is defined in the information name of large classification as "status monitoring", the information name of middle classification as "memory area A", and the information name of small classification as "threshold value 1". In addition, value "reset after switching" is defined in the information name of large classification as "status monitoring", the information name of middle classification as "memory area A", and the information name of small classification as "recovery processing 1".

Similarly, value "85%" is defined in the information name of large classification as "status monitoring", the information name of middle classification as "memory area A", and information name of small classification as "threshold value 2". In addition, value "forced reset" is defined in the information name of large classification as "status monitoring", the information name of middle classification as "memory area A", and the information name of small classification as "recovery processing 2".

Similarly, value "80%" is defined in the information name of large classification as "status monitoring", the information name of middle classification as "memory area B", and the information name of small classification as "threshold value 1". In addition, value "restart after switching" is defined in the information name of large classification as "status monitoring", the information name of middle classification as "memory area B", and the information name of small classification as "recovery processing 1".

Similarly, value "90%" is defined in the information name of large classification as "status monitoring", the information name of middle classification as "memory area B", and the information name of small classification as "threshold value 2". In addition, value "forced restart" is defined in the information name of large classification as "status monitoring", the information name of middle classification as "memory area B", and the information name of small classification as "recovery processing 2".

As described above, one or more sets of a threshold value and a recovery processing are prepared. In addition, when the data reaches the threshold value, the corresponding recovery processing is executed.

The recovery processing include 6 types such as forced termination, termination after switching, forced restart, restart after switching, forced reset, and reset after switching of a VM. In addition, another recovery processing may be provided.

The "forced" indicates that a recovery processing is executed without existence of a standby VM, and the "after switching" indicates that after waiting the appearance of a standby VM, dispatching of load balancer is switched and, a recovery processing is executed. In addition, the "reset" indicates that Full GC and other processing is executed, resources are made available.

Priority levels are given to the recovery processing and stored in the data storage unit 51 as the priority level table 57. When a recovery processing having a high priority level is desired in the execution of another recovery processing, the recovery processing having a high priority level is executed. FIG. 5 illustrates examples of priority levels of recovery processing. In the example illustrated in FIG. 5, the "forced termination" corresponds to priority level 1, the "termination after switching" corresponds to priority level 2, the "forced restart" corresponds to priority level 3, the "restart after switching" corresponds to priority level 4, the "forced reset" corresponds to priority level 5, and the "reset after switching" corresponds to priority level 6.

Figure 6:
FIG. 6 illustrates a VM management table 55 in FIG. 1.

FIG. 6 illustrates a VM management table 55 illustrated in FIG. 1. The VM management table 55 is used for determining a communication system between a VM and other VMs and for executing failover when a standby VM exists after the VM communicates with the other VMs.

FIG. 6 illustrates a table when an operation starts and a table after a VM is added. In the table, when an operation starts, a VM having machine name "A", protocol "JMX-SNMP", host name/IP address "app1.fu.com", and port number "162", and a VM having machine name "B", protocol "JMX-RMI", host name/IP address "app2.fu.com", and port number "2001" are registered.

In addition, in the table after a VM is added, a VM having a machine name "C", protocol "JMX-RMI", host name/IP address "app3.fu.com", and port number "2001", and a VM having machine name "D", protocol "JMX-RMI", host name/IP address "app4.fu.com", and port number "2003" are registered.

[Processing Operation]

FIG. 7 illustrates startup processing and mutual recognition processing of a VM. When a VM is joined to an information processing system, the VM broadcasts the joining to other VMs and exchanges information with the other VMs. Each of the VMs is preliminarily decided to be an active VM or a standby VM, and the number of active VMs and the number of standby VMs may be adjusted by adding and deleting the VMs.

For example, when a VM starts up and the definition information 56 is obtained (S101), the VM notifies other VMs of the joining to the information processing system by broadcasting (S102). The VM updates the VM management table 55 (S103) and the VM determines whether to be an active VM or a standby VM (S104). When the VM is an active VM, the VM requests the load balancer to start dispatching to the VM (S105) and starts operations as an active VM. In addition, when the VM is a standby VM, the VM requests the load balancer to terminate the dispatching to the VM (S106) and starts operations as a standby VM.

For example, when an application server A starts up, the application server A broadcasts to other VMs using a specified protocol and indicates the intention of joining to the information processing system. An application server B that receives the broadcast responds to the application server A. In addition, the application server A and the application server B executes mutual recognition each other as appropriate, thereby improving security of the system.

The application server A and the application server B exchange information with each other to update the VM management table 55, and each of the application server A and the application server B updates the VM management table 55.

Figure 8A:
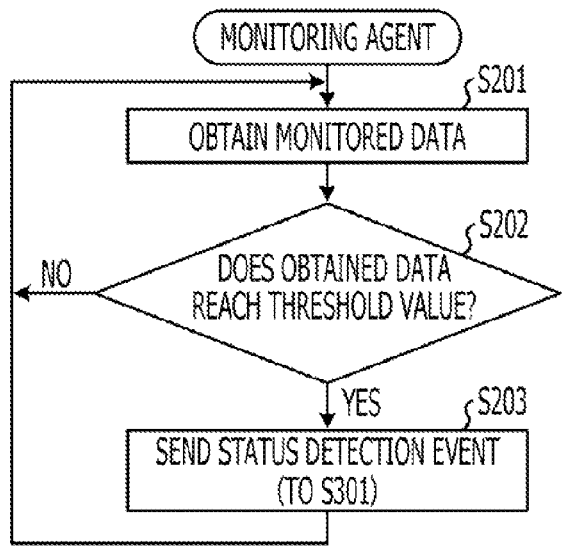
FIG. 8A illustrates a flowchart of processing of an active VM.
Figure 8B:
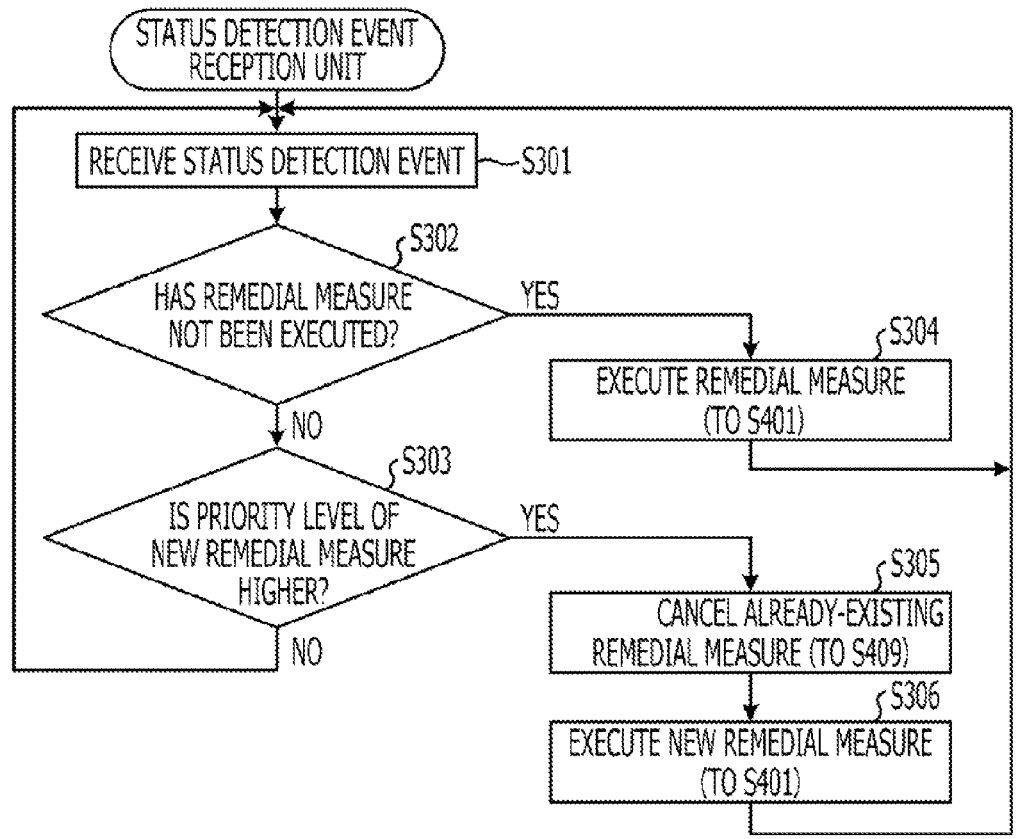
FIG. 8B illustrates a flowchart of the processing of the active VM.
Figure 8C:
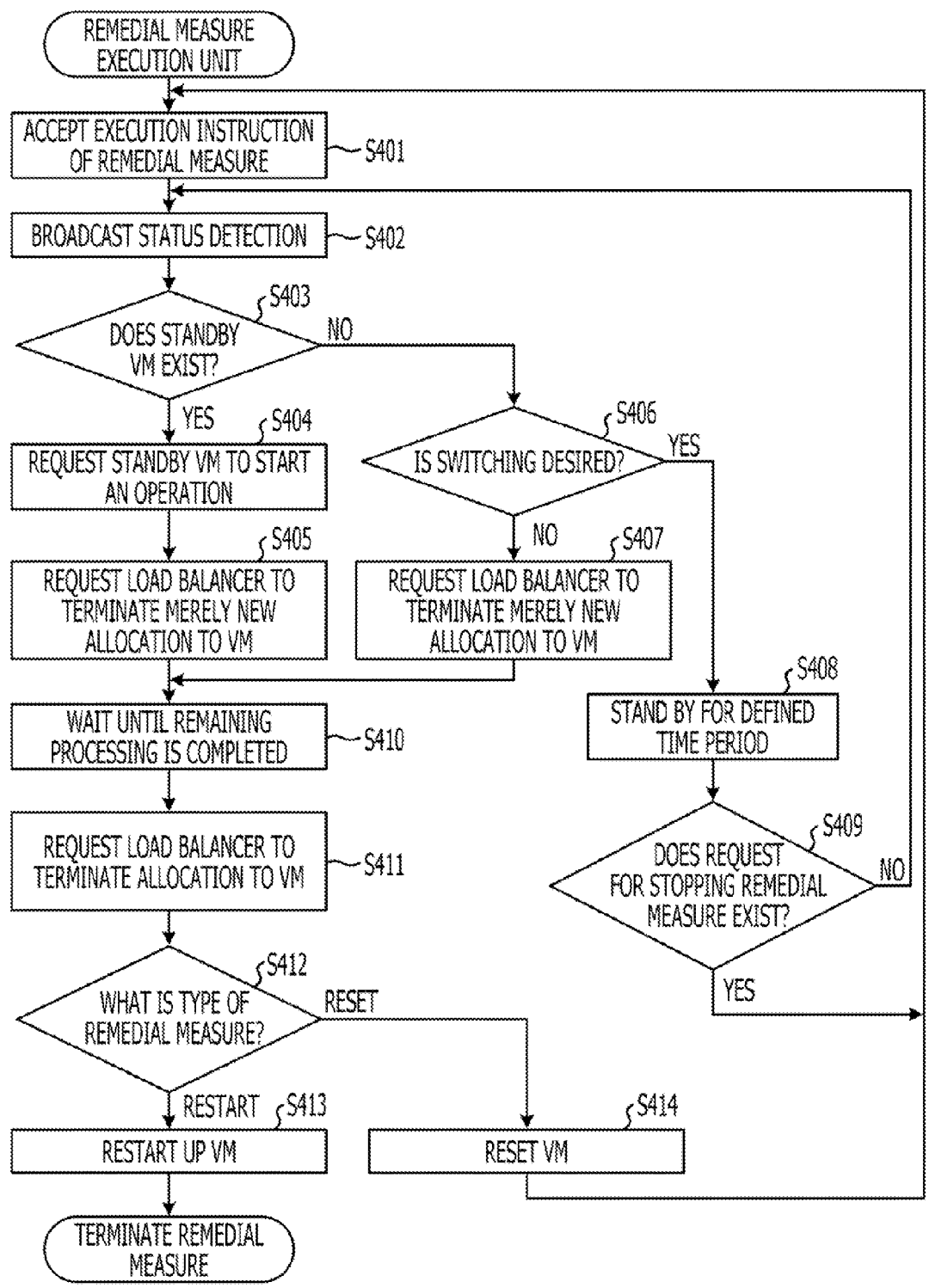
FIG. 8C illustrates a flowchart of the processing of the active VM.

FIGS. 8A to 8C illustrate flowcharts of processing of an active VM. The monitoring agent 31 in an active VM obtains monitoring data (S201), and when the data reaches a threshold value (YES in S202), processing for sending a status detection event is repeated (S203).

The status detection event reception unit 61 receives a status detection event (S301), the status detection event reception unit 61 determines whether a recovery processing has not been executed (S302). When a recovery processing has not been executed (YES in S302), the status detection event reception unit 61 executes a recovery processing (S304).

When a recovery processing is currently being executed (NO in S302), the status detection event reception unit 61 determines whether a priority level of a new recovery processing is higher than a priority level of an already-existing recovery processing that has been executed (S303). When a priority level of a new recovery processing is lower than a priority level of an already-existing recovery processing (NO in S303), the status detection event reception unit 61 returns to Operation S301. In addition, when a priority level of a new recovery processing is higher than a priority level of an already-existing recovery processing (YES in S303), the status detection event reception unit 61 terminates the already-existing recovery processing (S305), executes the new recovery processing (S306), and returns to Operation S301. When a recovery processing is not currently being executed (NO in S303), the processing for receiving a status detection event (S301) and the subsequent processing are repeated.

When the recovery processing execution unit 62 accepts an execution instruction of a recovery processing (S401), the recovery processing execution unit 62 broadcasts status detection (S402). The recovery processing execution unit 62 determines whether a standby VM exists (S403). When a standby VM exists (YES in S403), start of an operation is requested to the standby VM (S404), and the load balancer is requested to terminate merely new dispatching to the VM that accepts the execution instruction of a recovery processing (S405).

When a VM does not exist (NO in S403), the recovery processing execution unit 62 determines whether switching of a VM is desired (S406). When switching of a VM is not desired (NO in S406), termination of a merely new dispatching to the VM that accepts the execution instruction of a recovery processing is requested to the load balancer (S407).

When the switching of a VM is desired (YES in S406), the recovery processing execution unit 62 stands by for a defined time period (S408) and determines whether a request for stopping the recovery processing exists (S409). In addition, when a request for stopping the recovery processing exists (YES in S409), the recovery processing terminates, and the process returns to Operation S401. When a request for stopping the recovery processing does not exist (NO in S409), the process returns to Operation S402.

After Operations S405 and S407, the recovery processing execution unit 62 waits until the remaining processing is completed (S410), requests the load balancer to terminate dispatching to the VM that accepts the execution instruction of a recovery processing (S411), and determines the type of the recovery processing (S412). When the type of the recovery processing is "restart", the VM that accepts the execution instruction of a recovery processing is restarted up (S413). When the type of the recovery processing is "reset", the VM that accepts the execution instruction of a recovery processing is reset (S414), and the processing terminates.

Figure 9:
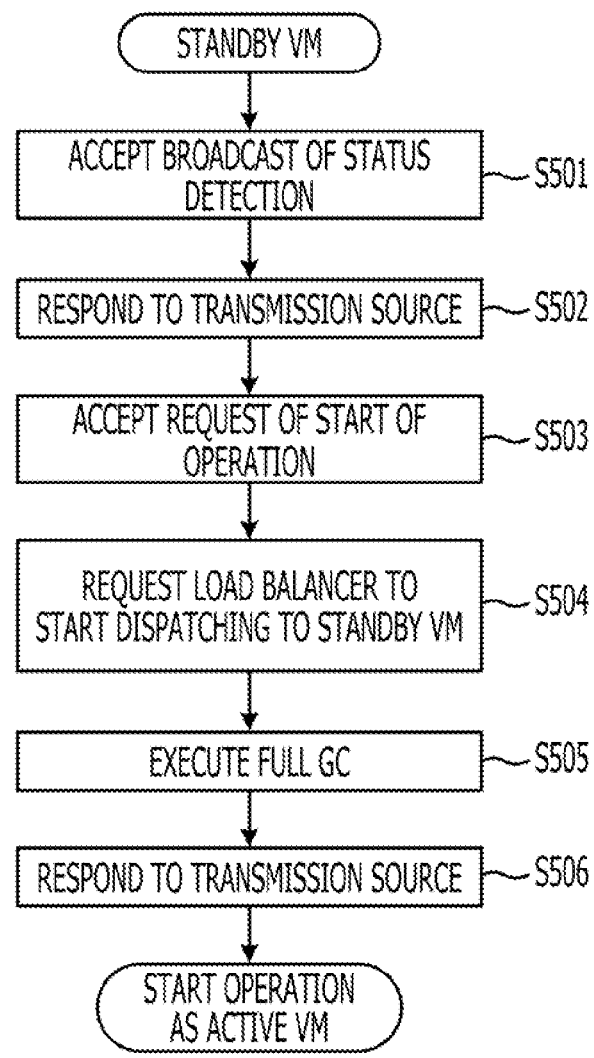
FIG. 9 illustrates a flowchart of processing of a standby VM.

FIG. 9 illustrates a flowchart of processing of a standby VM. When a standby VM accepts a broadcast of status detection (S501), the standby VM responds to a transmission source (S502). When the standby VM accepts a request of start of the operation (S503), the standby VM requests the load balancer to start dispatching to the standby VM (S504). In addition, the standby VM executes Full GC (S505) and becomes an active VM after responding to the transmission source (S506).

Figure 10:
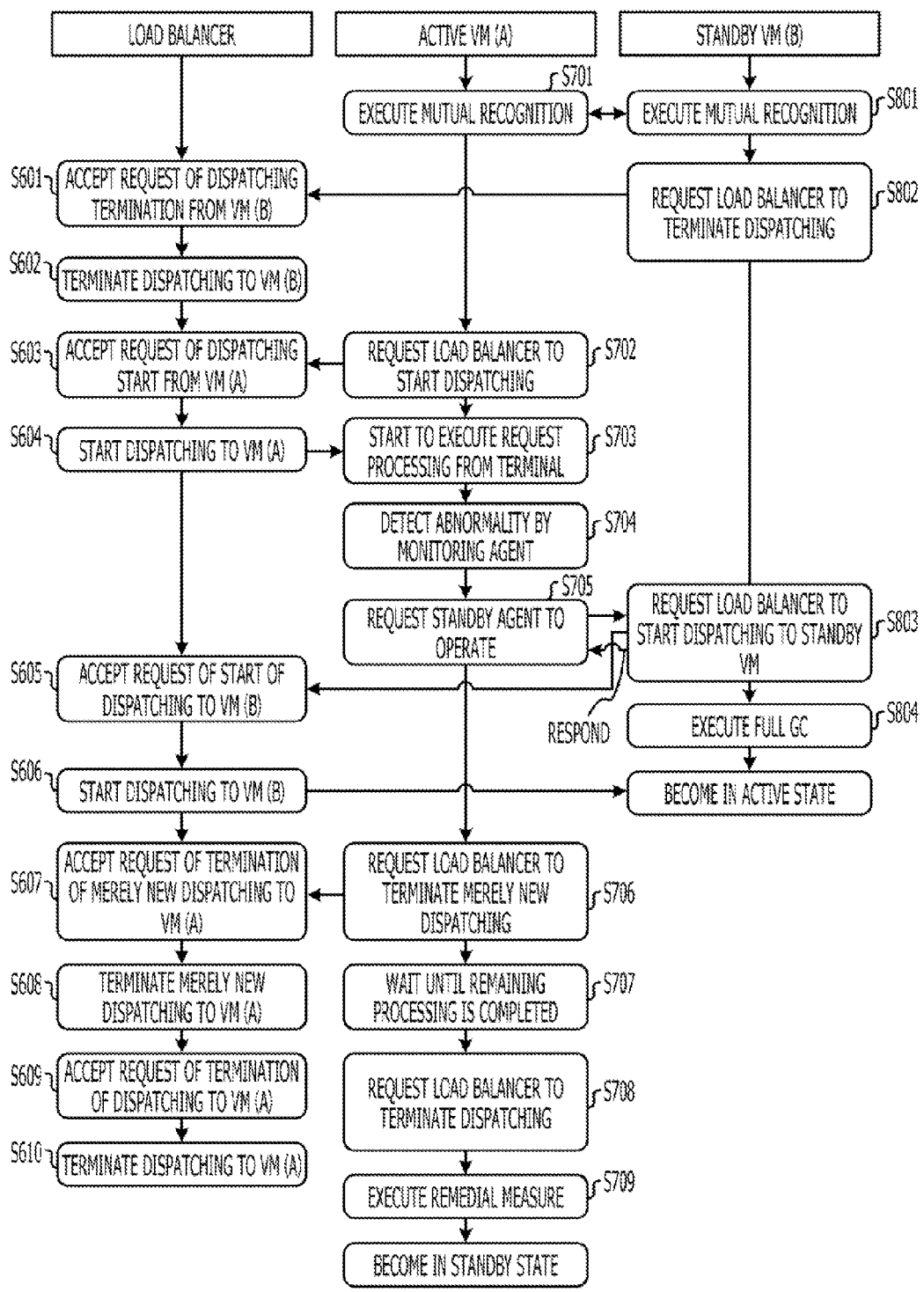
FIG. 10 illustrates a cooperation between devices in the computing system.

FIG. 10 illustrates a cooperation between devices in the computing system. First, an active VM and a standby VM execute mutual recognition each other. That is, the active VM recognizes the standby VM (S701), and the standby VM recognizes the active VM (S801).

The active VM requests the load balancer to start dispatching user requests (S702), and the standby VM requests the load balancer to terminate dispatching user requests (S802). The load balancer accepts a request to terminate dispatching user request from a standby VM (B) (S601), and terminates diapatching user requests to the standby VM (B) terminates (S602). In addition, the load balancer accepts a request to start dispatching user requests from an active VM (A) (S603), and dispatching user requests to the active VM (A) starts (S604).

The active VM starts to execute user request processing from a terminal (S703). When the active VM detects abnormality by the monitoring agent (S704), the active VM requests the standby VM to operate (S705). The standby VM responds to the active VM, requests the load balancer to start dispatching user requests to the standby VM, (S803), executes Full GC (S804), and switches to an active state.

The load balancer accepts a request of start dispatching user requests to the standby VM (B) (S605) and starts dispatching user requests to the standby VM (B) (S606).

The active VM requests the load balancer to terminate dispatching new user requests (S706) and waits until the remaining processing is completed (S707). When the remaining processing is completed, the active VM requests the load balancer to terminate dispatching user requests (S708), executes a recovery processing (S709), and switches to a standby state.

When the load balancer accepts a request to terminate dispatching new user requests to the VM that is the active VM (S607), the load balancer terminates dispatching new user requests to the VM that is the active VM (S608). The load balancer accepts a request to terminate dispatching user requests to the active VM (A) (S609) and terminates dispatching user requests to the active VM (A) (S610).

Figure 11:
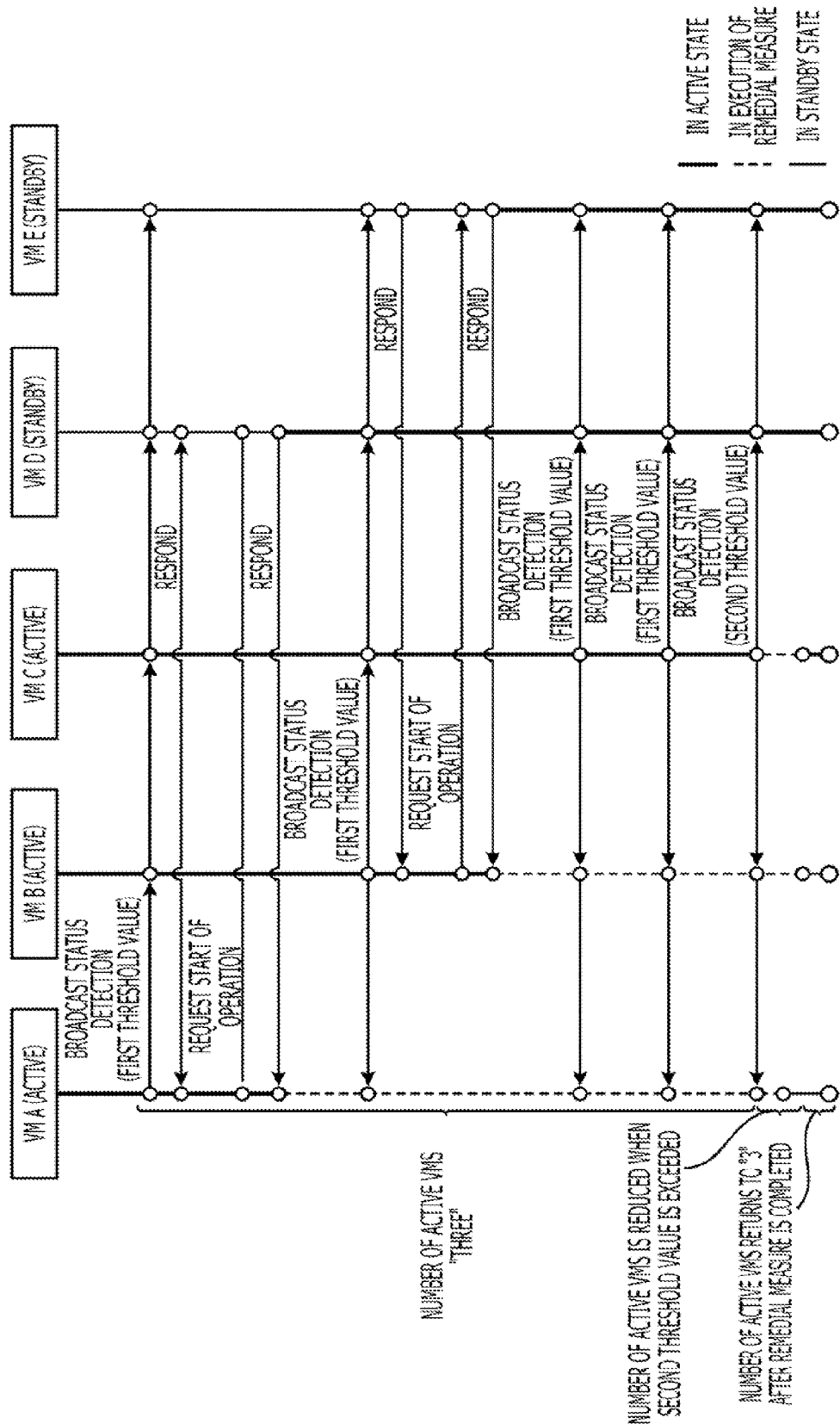
FIG. 11 illustrates a cooperation between an active VM and a standby VM.

FIG. 11 illustrates a cooperation between an active VM and a standby VM. In the example illustrated in FIG. 11, when, from among five of VMs A to E, the VMs A to C operates in an initial state, the VMs D and E stand by in the initial state. In addition, in FIG. 11, an active VM is indicated by a thick line, a standby VM is indicated by a fine line, and a VM in which a recovery processing is taken is indicated by a broken line.

In an example illustrated in FIG. 11, first, the VM A that is an active VM broadcasts a status detection by a first threshold value, to the VMs B to E. In addition, the VM D that is a standby VM initially responds to the broadcast source. The VM A that is the broadcast source requests the VM D that has initially responded to start an operation, and executes a recovery processing. The VM D that has received the request responds to the request, and then switches to an active state.

The active VM B broadcasts status detection by the first threshold value, to the VMs A, and C to E. In addition, the standby VM E responds to the broadcast source. The VM B that is the broadcast source requests the VM E that has initially responded to start an operation, and executes a recovery processing. The VM E that has received the request responds to the request, and then switches to an active state.

In addition, the active VM C broadcasts a status detection by the first threshold value, to the VMs A, B, D, and E. There is no standby VM that may respond to the broadcast. Thus, switching processing is suspended, and the VM C repeats to broadcast status detection by the first threshold value periodically. When a standby VM does not exist even after a second threshold value is exceeded, the broadcast is cancelled, and a recovery processing starts.

The number of active VMs "3" may be maintained by causing a standby VM to proceed to an active state before the VM C exceeds the second threshold value and proceeds to a recovery processing. After the VM C exceeds the second threshold value and proceeds to a recovery processing, the number of active VMs is reduced to "2". However, when a recovery processing for the VM C is completed, the VM C returns to the active state, so that the number of active VMs returns to "3". The VMs A and B become standby VMs after completion of the recovery processings.

As described above, in the computing system 1 according to the first embodiment, VMs autonomously execute failover control for each other without an operation management apparatus (that is, an operation is transferred to a standby VM). In addition, performance monitoring is executed by providing two stage threshold values in memory consumption in order to reduce the risk of being in a high-load state. In addition, after the system starts up, an active or standby VM may be added or deleted based on the number of requests or implementation of an application. That is, provisioning may be executed.

For example, the computing system 1 is an information processing system configured to include two or more VMs (Java VMs), and an active VM or standby VM may be added or deleted dynamically during the operation by preparing the active VM and the standby VM. A proportion of the number of active VMs to the number of standby VMs may not be limited to a fixed value.

In addition, the computing system 1 executes memory usage amount monitoring and abnormality monitoring using the two stage threshold values, detects an increase in the memory usage amount and generation of abnormality, and requests the load balancer to start dispatching user requests to a standby VM. In addition, the computing system 1 requests the load balancer to terminate dispatching new user requests to an active VM, stands by until remaining processing in an active VM is completed, and completely terminates dispatching user requests to an active VM, to the load balancer. In addition, the computing system 1 executes releasing of a resource (Full GC) or restart of an active VM and causes the active VM to become a standby VM. The computing system 1 may return to the standby VM depending on the number of active VMs.

By the above-described configuration and operations, in the computing system 1, a VM executes performance monitoring autonomously without an operation management apparatus, and VMs communicate with each other directly, thereby achieving failover. Thus, in comparison with a case in which the operation management apparatus is provided, the monitoring may be executed with a high degree of accuracy, and a communication cost between the computing system 1 and the operation management apparatus may be desirably reduced. In addition, maintenance workload for the operation management apparatus may also be desirably reduced.

In addition, the two stage threshold values may be provided for a memory usage amount based on a specification of a VM. When a VM exceeds a first threshold value and failover occurs, Full GC is executed immediately. When a VM exceeds a second threshold value without an occurrence of failover, Full GC is executed without executing the failover. As a result, the probability of the failover occurring increases, thereby achieving a system operation in which processing efficiency is may not be reduced desirably. In addition, incidence of failure may be reduced, thereby improving the stable operation.

In addition, VMs communicate with each other, and provisioning may be executed without termination of the system based on application characteristics and the number of requests to increase or delete information of a VM, the number of active VMs, and the number of standby VMs.

As described above, the computing system 1 may reduce load of application processing in the execution of GC and operates VMs stably.

Second Embodiment

[Configuration of the Computing System]

Figure 12:
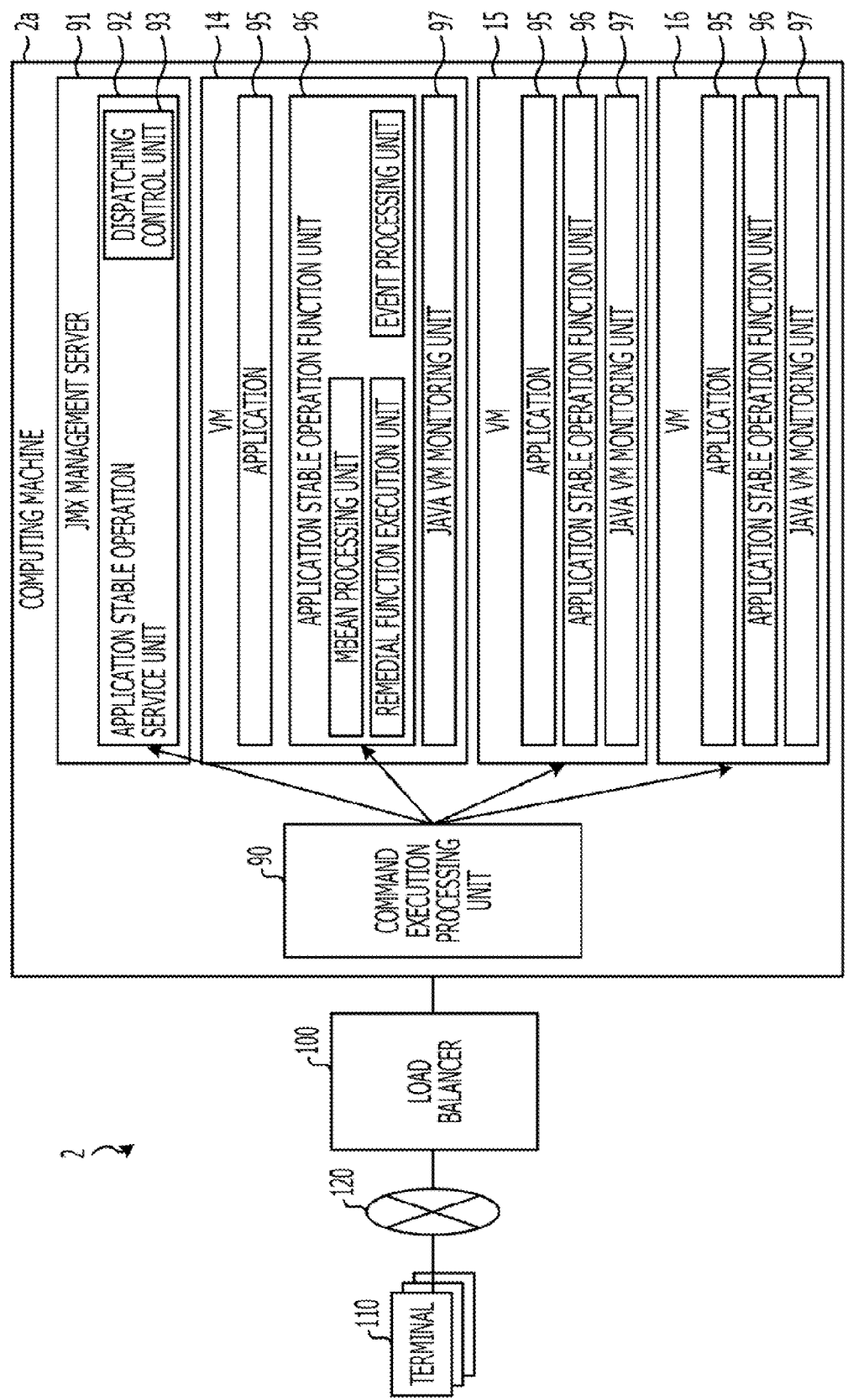
FIG. 12 illustrates a configuration of a computing system according to a second embodiment.
Figure 13:
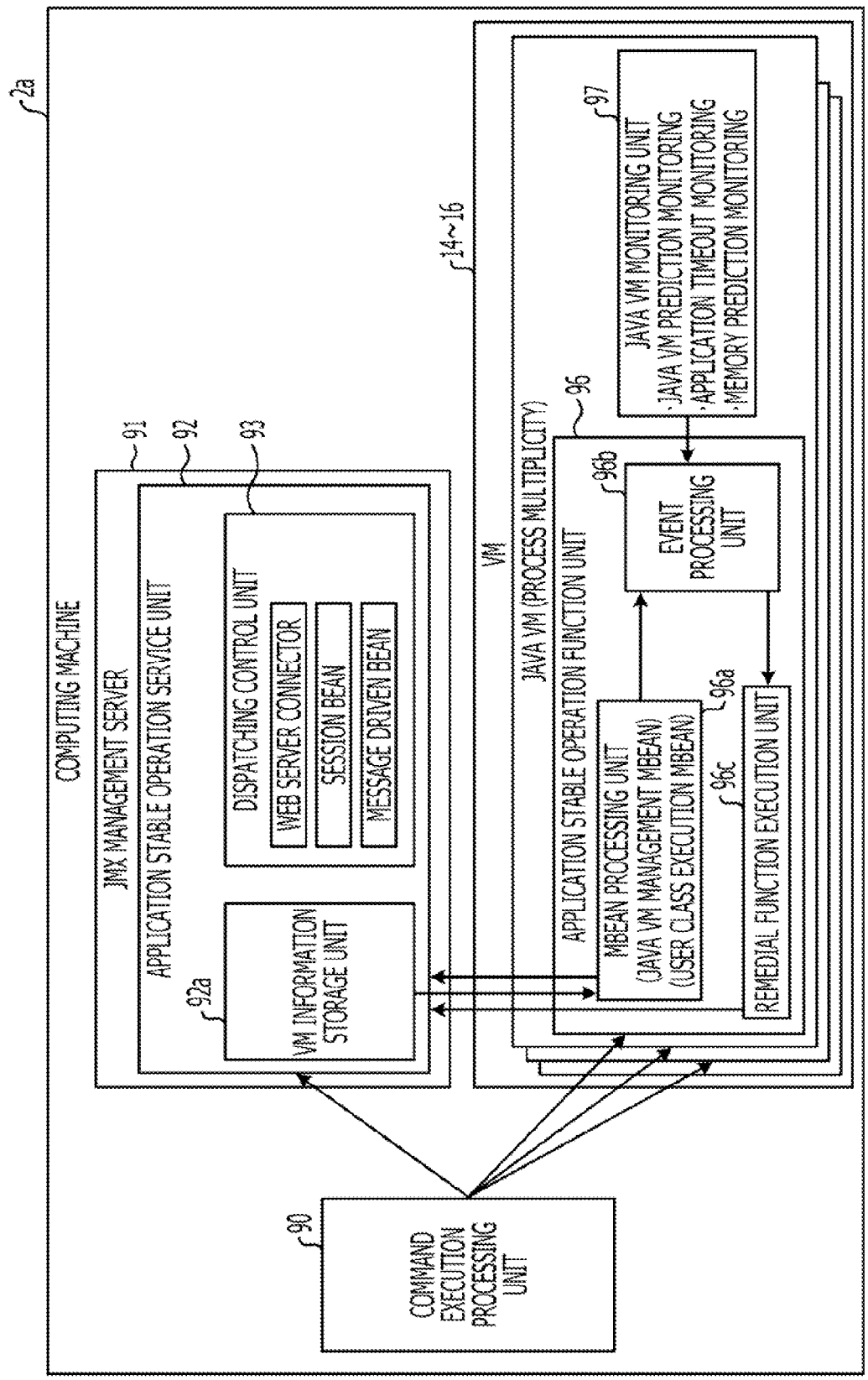
FIG. 13 illustrates the structure of a computing machine in FIG. 12.

FIG. 12 illustrates configuration of a computing system according to a second embodiment. In addition, FIG. 13 illustrates the structure of the computing machine in FIG. 12. A computing system 2 illustrated in FIG. 12 includes a configuration in which the load balancer 100 is coupled to a computing machine 2A. In addition, in the computing system 2, the load balancer 100 is coupled to the terminal group 110 through the network 120.

The computing machine 2A performs functions of a command execution processing unit 90, a JMX management server 91, and VMs 14 to 16 using software. The command execution processing unit 90 executes processing corresponding to various commands with respect to the JMX management server 91 and the VMs 14 to 16. Such commands include a command for instructing execution of GC in a given opportunity.

The JMX management server 91 includes an application stable operation service unit 92. As illustrated in FIG. 13, the application stable operation service unit 92 manages information of a VM by a VM information storage unit 92a and manages the VMs 14 to 16 by a dispatching control unit 93, thereby operating the VMs 14 to 16 stably. The dispatching control unit 93 includes WebServiceConnector, SessionBean, and MessageDrivenBean.

Each of the VMs 14 to 16 includes an application 95, an application stable operation function unit 96, and a Java VM monitoring unit 97. The application 95 executes computing processing allocated to the VM including the application 95. When execution of GC is instructed in the active state in which computing processing may be executed, the application stable operation function unit 96 switches the state of another standby VM into an active state and functions as a stable operation processing unit that starts GC after switching of the state.

The application stable operation function unit 96 includes an MBean processing unit 96a, an event processing unit 96b, and a remedial function execution unit 96c. The MBean processing unit 96a executes resource management (Java VM management MBean, user class execution MBean), and registers a state corresponding to the state when a status is detected, into the VM information storage unit 92a through the application stable operation service unit 92. In addition, during standby, the MBean processing unit 96a receives a request of application for an active state, from the application stable operation service unit 92 and sends the request to the event processing unit 96b.

The event processing unit 96b receives notification of an event from the MBean processing unit 96a, and a Java VM monitoring unit 97 causes the remedial function execution unit 96c to execute a recovery processing. The Java VM monitoring unit 97 executes prediction monitoring of a Java VM, timeout monitoring of an application, and prediction monitoring of a memory, and notifies the event processing unit 96b of the occurrence of an event when the event occurs.

[Description of the Processing Operations]

Figure 14:
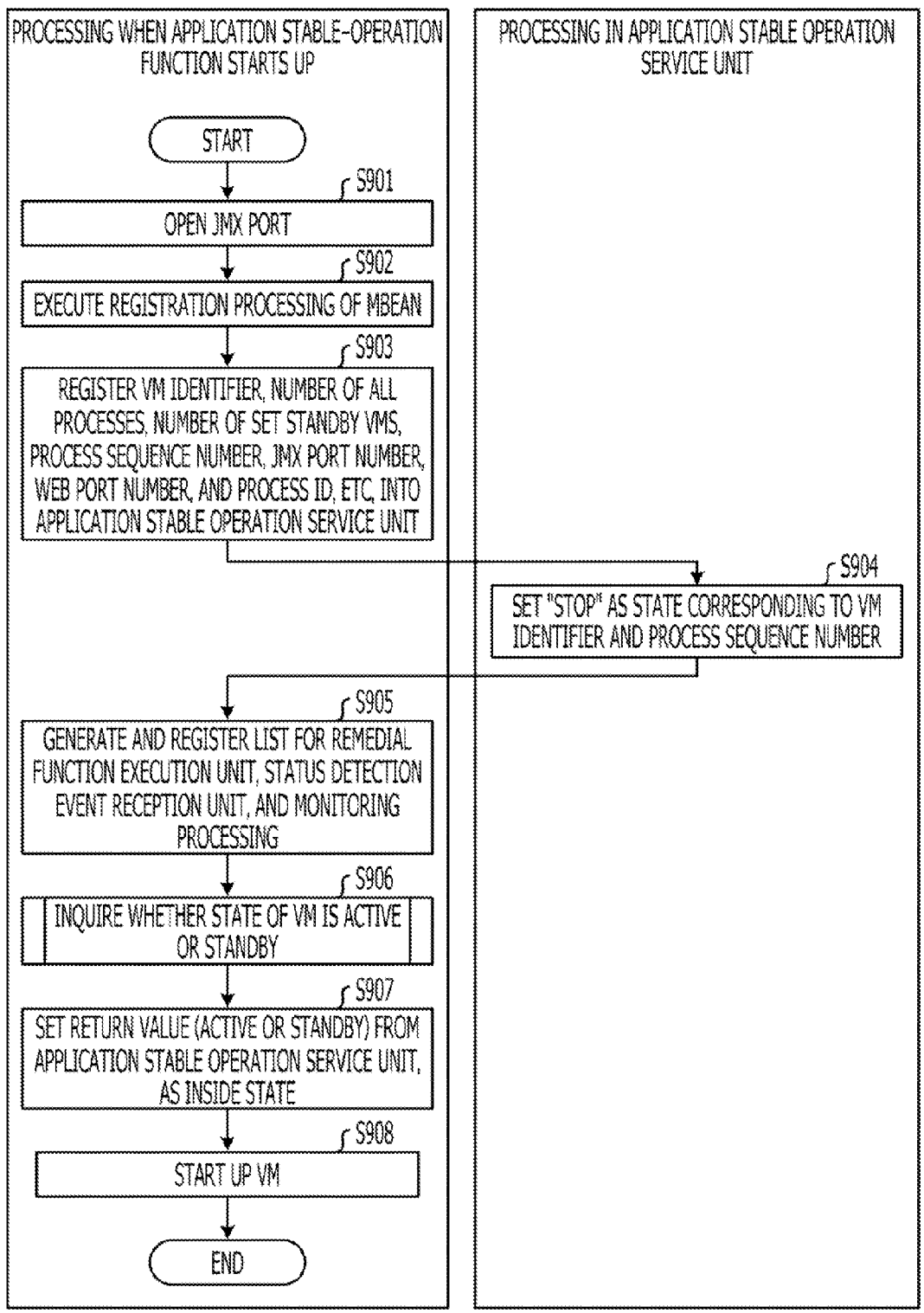
FIG. 14 illustrates a flowchart of start processing of a VM.

FIG. 14 illustrates a flowchart of a start processing of a VM. When a VM starts processing at the time of startup of an application stable operation function, the VM opens a JMX port (S901) and executes registration processing of MBean (S902). In addition, a VM identifier, the number of all processes, the number of set standby VMs, process sequence number, JMX port number, web port number, and process ID, etc. are registered into the application stable operation service unit 92 (S903).

The application stable operation service unit 92 sets "STOP" as a state corresponding to a VM identifier and a process sequence number, in response to the registration (S904).

Figure 15:
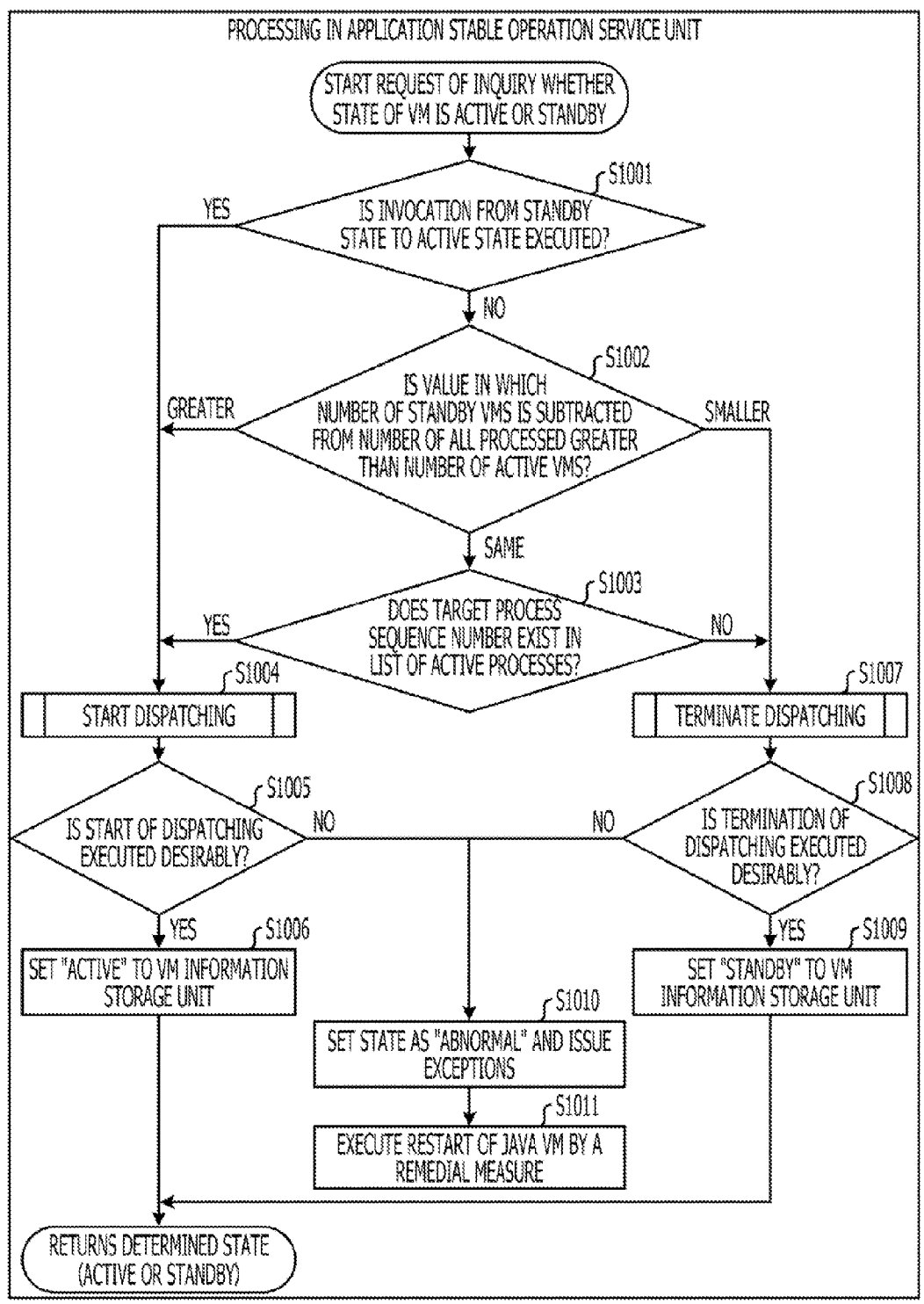
FIG. 15 illustrates a flowchart of active/standby inquiry processing (S906) in FIG. 14.

The application stable operation function generates and registers a list for the remedial function execution unit 96c, the status detection event reception unit 61, and the monitoring processing (S905). In addition, the application stable operation function inquires whether the state of the VM is active or standby as illustrated in FIG. 15 (S906), and sets a return value (ACTIVE or STANDBY) from the application stable operation service unit 92, as an inside state (S907). When the above described procedures are executed, a VM starts up (S908).

FIG. 15 is a flowchart illustrating an inquiry regarding whether the state of the VM is active or standby (S906) as illustrated in FIG. 14. When an active state or a standby state request inquiry starts, the application stable operation service unit 92 determines whether invocation from a standby state to an active state is executed (S1001).

When invocation from a standby state to an active state is not executed (NO in S1001), the application stable operation service unit 92 compares a value in which the number of standby VMs is subtracted from the number of all processes, with the number of current active VMs (S1002).

When the value in which the number of standby VMs is subtracted from the number of all processed equals to the number of current active VMs ("SAME" in S1002), the application stable operation service unit 92 determines whether a target process sequence number exists in a list of all processes that are in a current ACTIVE state (S1003).

Figure 19:
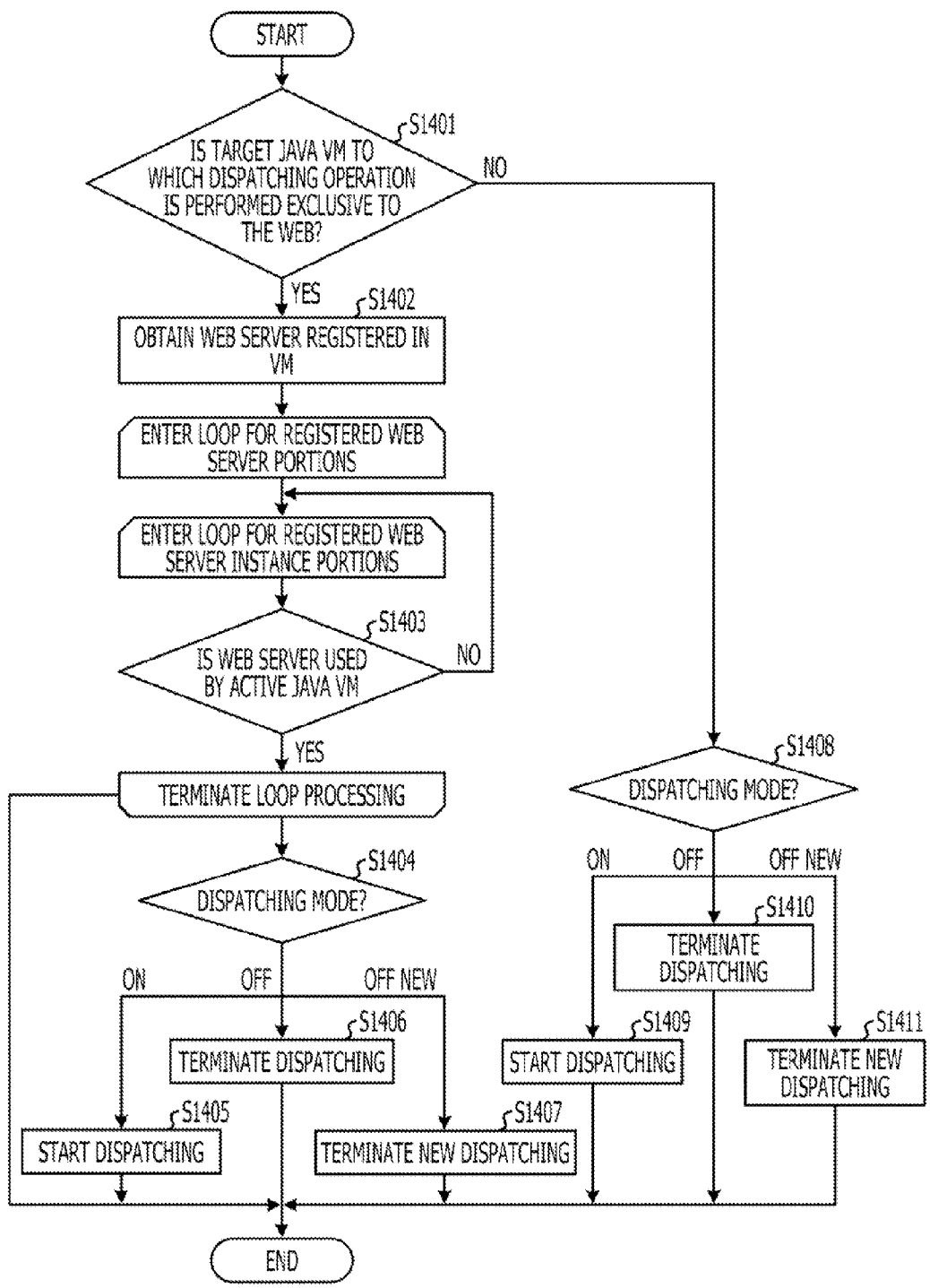
FIG. 19 illustrates a flowchart of operations of dispatching processing.

The application stable operation service unit 92 starts dispatching processing illustrated in FIG. 19 (S1004) under the following conditions:

- A condition where the invocation from a standby state to an active state is executed (YES in S1001);
- A condition where the value in which the number of standby VMs is subtracted from the number of all processed is greater than the number of current active VMs ("GREATER" in S1002);
- A condition where the target process sequence number exists in the list of all processes that are in a current ACTIVE state (YES in S1003).

When the start of dispatching is executed desirably (YES in S1005), the application stable operation service unit 92 sets "ACTIVE" to the VM information storage unit 92a (S1006) and returns the determined state (ACTIVE).

The application stable operation service unit 92 terminates the dispatching processing illustrated in FIG. 19 (S1007) under the following conditions:

- A condition where the value in which the number of standby VMs is subtracted from the number of all processes is smaller than the number of current active VMs ("SMALLER" in S1002);
- A condition where the target process sequence number does not exist in the list of all processes that are in a current ACTIVE state (NO in S1003).

When the termination of dispatching is executed desirably (YES in S1008), the application stable operation service unit 92 sets "STANDBY" to the VM information storage unit 92a (S1009) and returns the determined state (STANDBY).

When the start and termination of dispatching is not executed (NO in S1005 and S1008), the application stable operation service unit 92 sets the state as "ABNORMAL" and issues exceptions (S1010). After that, restart of the Java VM is executed by a recovery processing (S1011).

Figure 16:
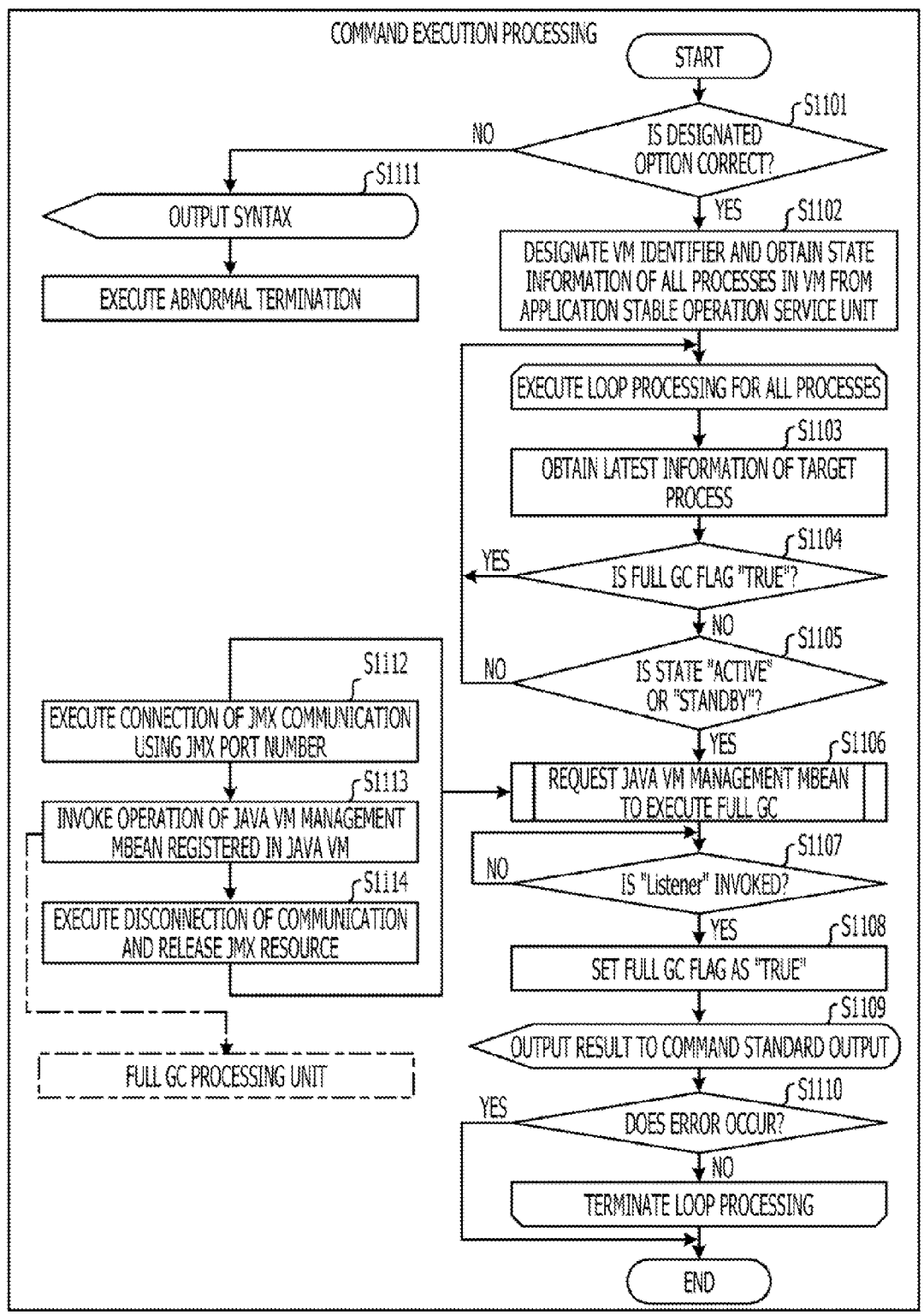
FIG. 16 illustrates a flowchart of Full GC processing from the outside by a command execution processing unit.

FIG. 16 illustrates a flowchart of external Full GC processing by the command execution processing unit 90. In the external Full GC processing, the command execution processing unit 90 first determines whether a designated option is correct (S1101). When the designated option is not correct (NO in S1101), the command execution processing unit 90 outputs "SYNTAX" (S1111) and executes abnormal termination.

When the designated option is correct (YES in S1101), the command execution processing unit 90 designates a VM identifier and obtains state information of all processes in the VM from the application stable operation service unit 92 (S1102). In addition, the VM information storage unit 92a set Full GC flags of all Java VMs as "False".

The command execution processing unit 90 executes loop processing for the all processes in Operations S1103 to S1110.

In the loop processing, for example, the command execution processing unit 90 obtains the latest information of a target process (S1103) and determines whether a Full GC flag is "TRUE" (S1104). When the Full GC flag is "TRUE" (YES in S1104), the command execution processing unit 90 proceeds to processing of a subsequent process.

When the Full GC flag is "False" (NO in S1104), the command execution processing unit 90 determines whether the state is "ACTIVE" or "STANDBY" (S1105). When the state is not "ACTIVE" or "STANDBY" (NO in S1105), the command execution processing unit 90 proceeds to processing of a subsequent process.

When the state is "ACTIVE" or "STANDBY" (YES in S1105), the command execution processing unit 90 requests the Java VM management MBean to execute Full GC (S1106). In Operation S1106, for example, processing in Operations S1112 to S1114 is included. That is, connection of JMX communication is executed using a JMX port number (S1112), an operation of the Java VM management MBean registered in the Java VM is invoked (S1113), and disconnection of the communication and releasing of the JMX resource are executed (S1114).

In an operation subsequent to Operation S1106, after the command execution processing unit 90 stands by until "Listener" is invoked (YES in S1107), the command execution processing unit 90 sets the Full GC flag as "TRUE" (S1108) and outputs the result to a command standard output (S1109). The command execution processing unit 90 exits the loop and terminates when an error occurs (YES in S1110). The command execution processing unit 90 proceeds to processing of a subsequent process when an error does not occur (NO in S1110). In addition, the command execution processing unit 90 terminates the flow when processing for all of the processes is completed.

Figure 17:
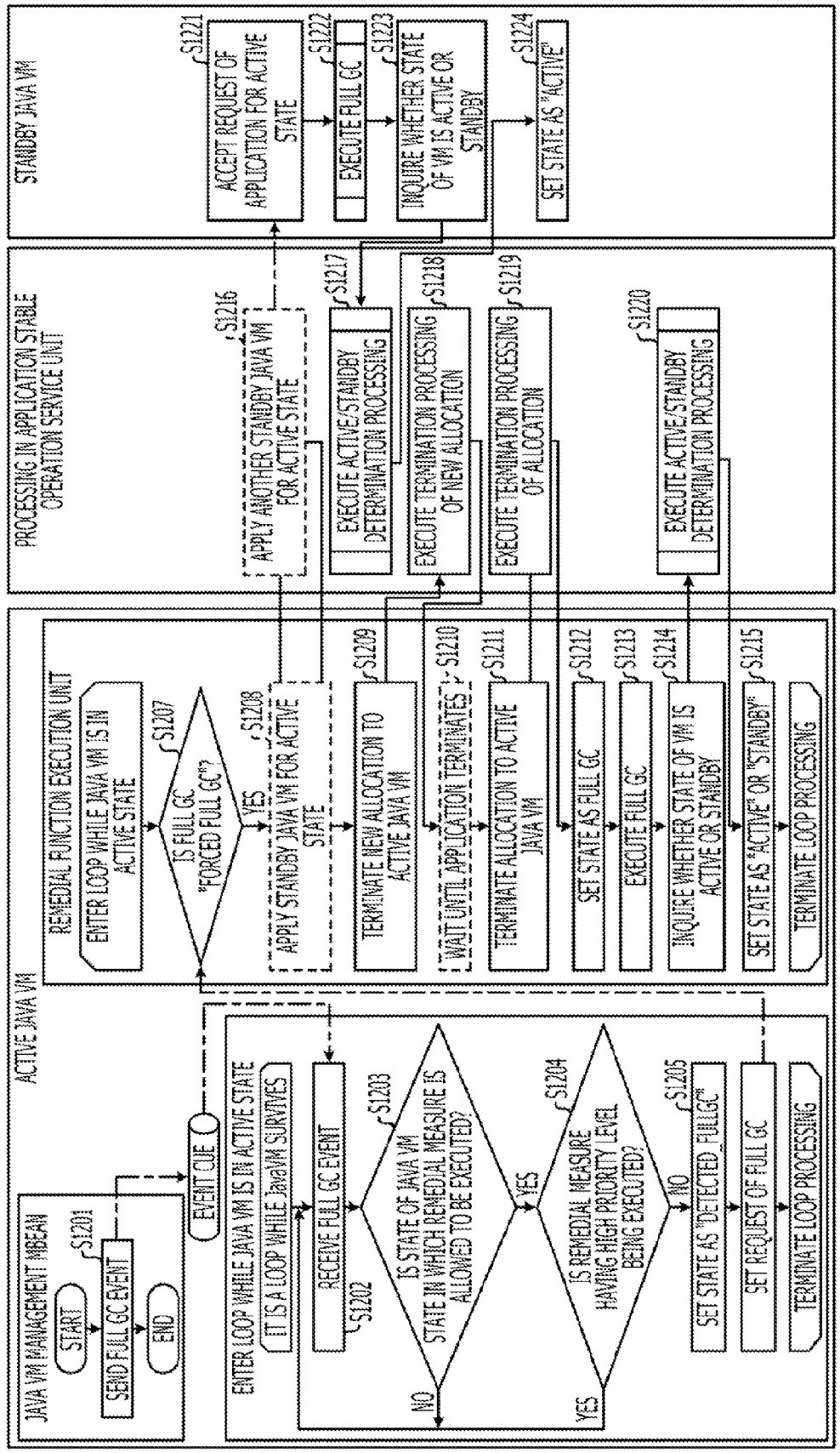
FIG. 17 illustrates a flowchart of Full GC processing by an active Java VM.

FIG. 17 illustrates a flowchart of Full GC processing by an active Java VM. A Full GC event sent by the Java VM management MBean is stored in an event queue (S1201).

In the processing that enters a loop while the Java VM is in an active state, the event processing unit 96b receives a Full GC event from the event queue (S1202). When the state of the Jave VM is a state in which a recovery processing is allowed to be executed (YES in S1203) and a recovery processing having high priority level is not being executed (NO in S1204), the state is set as "DETECTED_FULLGC" (S1205), and then a request of Full GC is set (S1206).

In the processing that enters a loop while the Java VM is in an active state, when the remedial function execution unit 96c receives the request of Full GC from the event processing unit 96b, the remedial function execution unit 96c determines whether the request of Full GC is a request executed by a command (hereinafter referred to as "forced Full GC") (S1207). When the request of Full GC is a forced Full GC (YES in S1207), the remedial function execution unit 96c requests the application stable operation service unit 92 to cause a standby Java VM to be applied for an active state (S1208).

A standby Java VM that is regarded as a target by the application stable operation service unit 92 (S1216) accepts a request of application for an active state (S1221). The standby Java VM that accepts the request of application for an active state inquires, to the application stable operation service unit 92, whether the state of the VM is active or standby (S1223) after the standby Java VM executes Full GC illustrated in FIG. 25 (S1222).

The application stable operation service unit 92 executes the active/standby determination processing illustrated in FIG. 15 in response to the inquiry from the standby Java VM (S1217). The state of the standby Java VM is set as ACTIVE in response to the results of the active/standby determination processing in Operation S1217 (S1224).

When another standby Java VM may be applied for an active state, the remedial function execution unit 96c requests the application stable operation service unit 92 to execute termination of new dispatching to a current active Java VM (S1209). In addition, the application stable operation service unit 92 executes termination processing of merely new dispatching to the active Java VM (S1218).

After the termination processing of merely new dispatching, the remedial function execution unit 96c in the active Java VM waits until termination of an application (S1210) and then requests the application stable operation service unit 92 to terminate dispatching to the active Java VM (S1211). The application stable operation service unit 92 executes the termination processing of dispatching to the active Java VM in response to the request (S1219).

The state of the remedial function execution unit 96c in the active Java VM is set as "Full GC" (S1212), and the remedial function execution unit 96c executes Full GC (S1213). After the execution of the Full GC, the remedial function execution unit 96c in the active Java VM inquires, to the application stable operation service unit 92, whether the state of the VM is active or standby (S1214).

The application stable operation service unit 92 executes the active/standby determination processing illustrated in FIG. 15 in response to the inquiry from the active Java VM (S1220). The state of the active Java VM is set as "ACTIVE" or "STANDBY" in response to the results of the active/standby determination processing in Operation S1220 (S1215), and the processing terminates.

Figure 18:
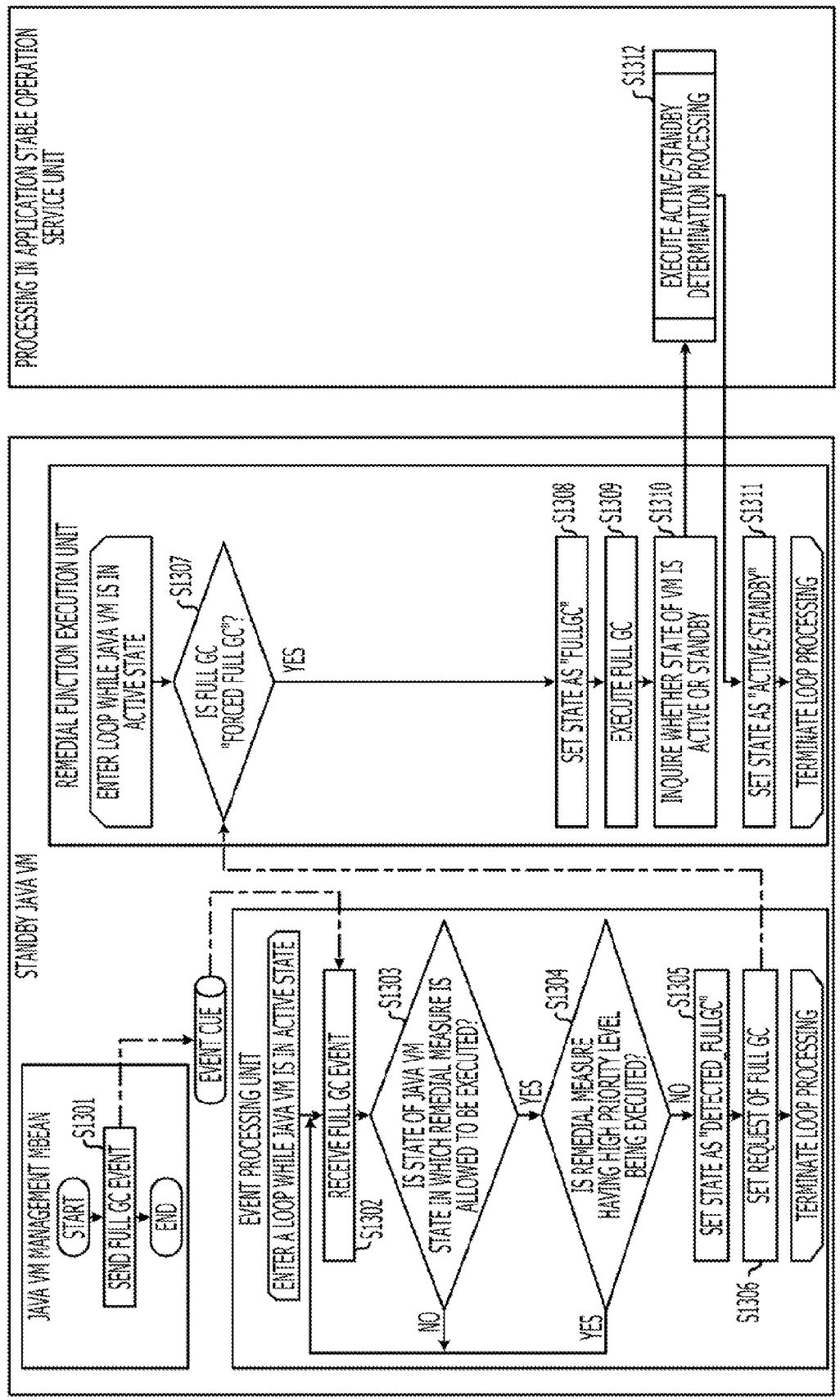
FIG. 18 illustrates a flowchart of Full GC processing by a standby Java VM.

FIG. 18 illustrates a flowchart of Full GC processing by a standby Java VM. The Full GC event sent by the Java VM management MBean is stored in the event queue (S1301).

In the processing that enters a loop while the Java VM is in an active state, the event processing unit 96b receives a Full GC event from the event queue (S1302). When the state of the Java VM is a state in which a recovery processing is allowed to be executed (YES in S1303) and a recovery processing having high priority level is not being executed (NO in S1304), the state is set as "DETECTED_FULLGC" (S1305), and a request of Full GC is set (S1306).

In the processing that enters a loop while the Java VM is in an active state, when the remedial function execution unit 96c receives the request of Full GC from the event processing unit 96b, the remedial function execution unit 96c determines whether the Full GC is a forced Full GC (S1307). When the Full GC is a forced Full GC (YES in S1307), the state of the remedial function execution unit 96c in a standby Java VM is set as "Full GC" (S1308), and the remedial function execution unit 96c executes Full GC (S1309). The remedial function execution unit 96c in the standby Java VM inquires, to the application stable operation service unit 92, whether the state of the VM is active or standby (S1310).

The application stable operation service unit 92 executes the active/standby determination processing illustrated in FIG. 15 in response to the inquiry from the standby Java VM (S1312). The state of standby Java VM is set to "ACTIVE" or "STANDBY" in response to the results of active/standby determination processing in Operation S1312 (S1311), and the processing terminates.

FIG. 19 illustrates a flowchart of operations of dispatching processing. The dispatching control unit 93 determines whether a target Java VM to which a dispatching operation is executed is exclusive to the Web (S1401). When the target Java VM to which a dispatching operation is executed is exclusive to the Web (YES in S1401), the dispatching control unit 93 obtains a web server registered in the VM (S1402), and processing for determining whether the web server is used by an active Java VM (S1403) enters a loop for registered web server instance portions and registered web server portions.

The dispatching control unit 93 determines an dispatching mode after the processing exits the loop when the web server is used by the active Java VM (S1404). When the state of the dispatching mode is "ON", dispatching starts (S1405). In addition, when the state of the dispatching mode is "OFF", dispatching terminates (S1406). In addition, when the state of the dispatching mode is "OFF_NEW", merely new dispatching terminates (S1407), and the processing terminates.

In addition, the target Java VM to which a dispatching operation is executed is not exclusive to the Web (NO in S1401), the dispatching control unit 93 determines the dispatching mode (S1408). When the state of the dispatching mode is "ON", dispatching starts (S1409). In addition, when the state of the dispatching mode is "OFF", dispatching terminates (S1410). In addition, when the state of the dispatching mode is "OFF_NEW", merely new dispatching terminates (S1411), and the processing terminates.

Figure 20:
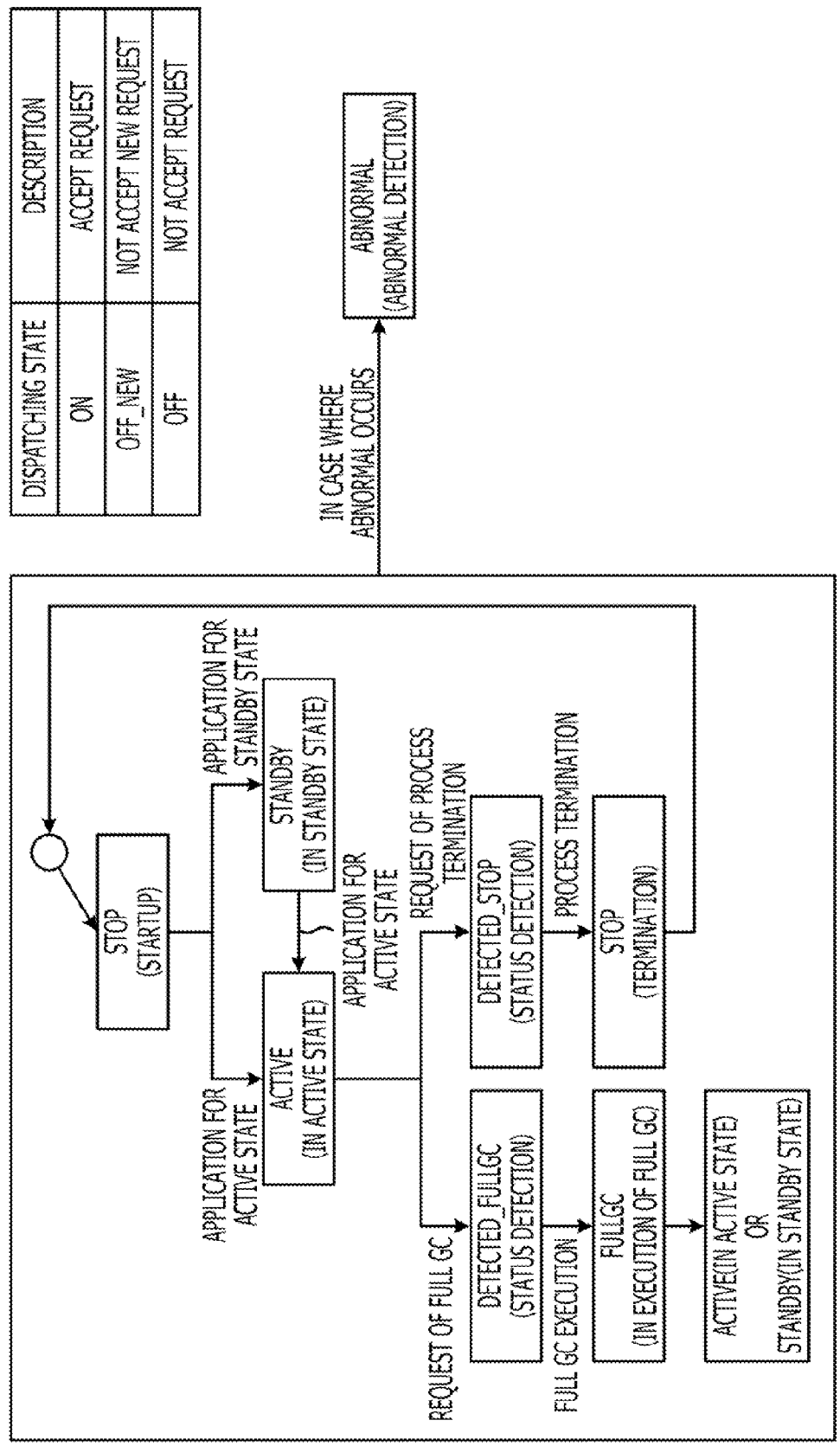
FIG. 20 illustrates a state transition diagram and a dispatching state of the Java VM.

FIG. 20 illustrates a state transition diagram and a dispatching state of a Java VM. When a Java VM starts up, the state of the Java VM is set as "STOP" by the application stable operation service unit 92, and the state of the Java VM may be set as "ACTIVE" indicating an active state or as "STANDBY" indicating a standby state. When the Java VM state of which is "STANDBY" is applied for an active state, the state becomes "ACTIVE" state.

When the Java VM state of which is "ACTIVE" receives a Full GC request, the state becomes "DETECTED_FULLGC" indicating that a status is detected in an "ACTIVE" state. The state is transferred from "DETECTED_FULLGC" to "FULLGC" indicating that Full GC is currently being executed, and the state may be set as "ACTIVE" indicating an active state or as "STANDBY" indicating a standby state after completion of the Full GC.

In addition, When the Java VM state of which is "ACTIVE" receives a process termination request, the state becomes "DETECTED_STOP" indicating that a status is detected in an "ACTIVE" state. After that, the processing terminates and, the state becomes a "STOP" state.

In addition, when abnormality occurs in each state, the state of the Java VM becomes "ABNORMAL" indicating that abnormality is detected.

The dispatching state may be set as "ON", "OFF_NEW", or "OFF". In the dispatching state "ON", the Java VM accepts a request. In the dispatching state "OFF_NEW", the Java VM accepts a request except for a merely new request. In addition, in the dispatching state "OFF", the Java VM does not accept a request.

FIG. 21 illustrates an example of data stored in the VM information storage unit 92a. "HASHMAP" held in the VM information storage unit 92a associates items of VM identifiers with items of target objects and includes the items. In the example of FIG. 21, VM identifiers 1 to 3 are registered. In addition, a hold object corresponding to the VM identifier 1 is "JavaBeans1_1", a hold object corresponding to the VM identifier 2 is "JavaBeans1_2", and a hold object corresponding to the VM identifier 3 is "JavaBeans1_3".

The "JavaBeans1_1" includes items such as VM identifier, the number of active processes, type, the number of standby processes, and Map object. In the "JavaBeans1_1" of the example of FIG. 21, "VM 1" is registered in the "VM identifier", "3" is registered in "the number of active processes", "WEB/EJB" is registered in "type", "1" is registered in "the number of standby processes", and "Map object" is registered in "JavaBeans2_1", respectively.

In addition, "JavaBeans2_1" held as Map object in the "JavaBeans1_1" includes items such as process sequence number, JMX port number, process ID, web port number, state, and Full GC flag. In the "JavaBeans2_1" of the example illustrated of FIG. 21, in process sequence number "1", JMX port number "20001", process ID "29358", web port number "8421", state "ACTIVE", and Full GC flag "False" are registered. In addition, in process sequence number "2", JMX port number "20002", process ID "29359", web port number "8422", state "ACTIVE", and Full GC flag "False" are registered. In addition, in process sequence number "3", JMX port number "20003", process ID "29361", web port number "8423", state "STANDBY", and Full GC flag "False" are registered.

Figure 22:
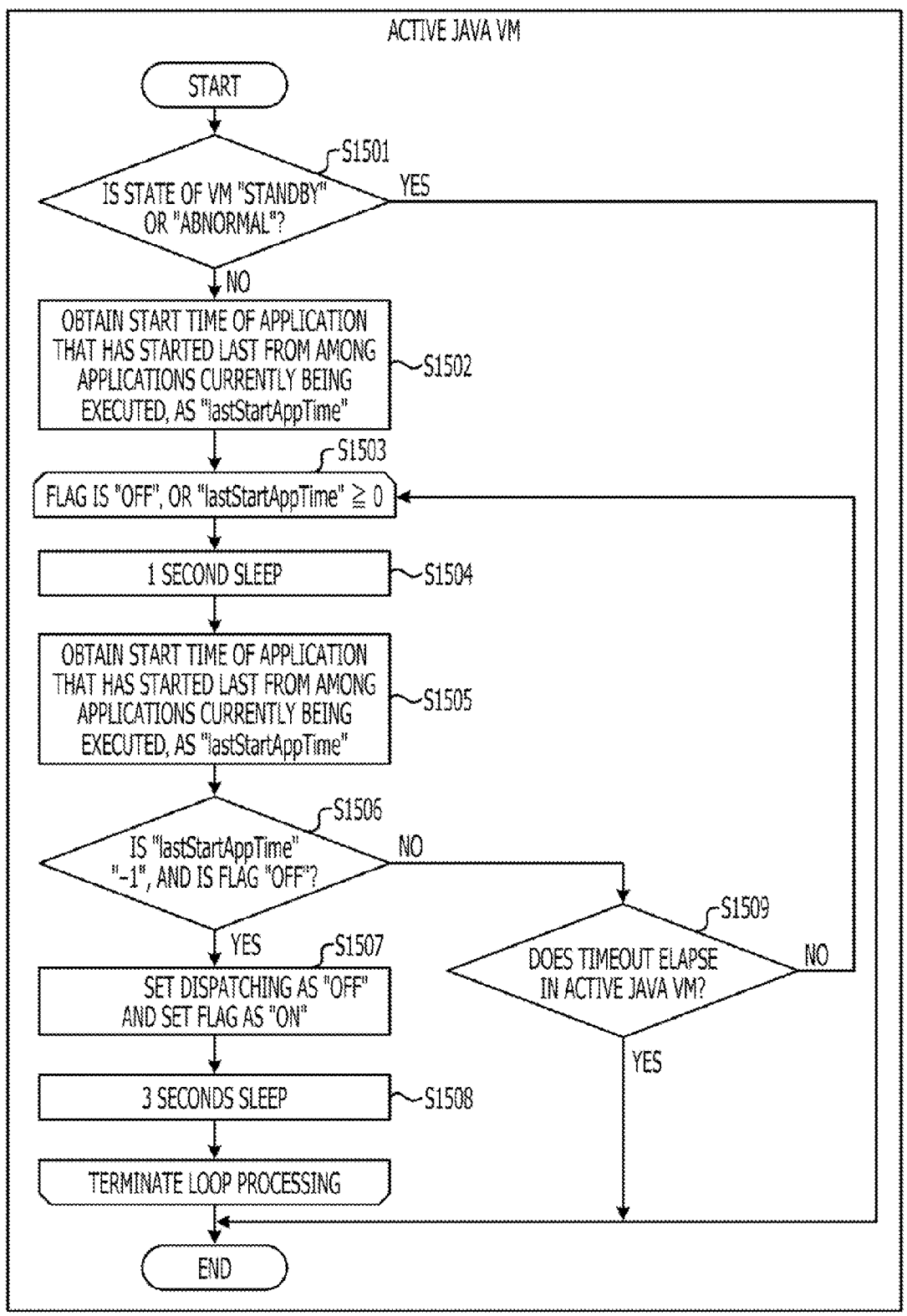
FIG. 22 illustrates a flowchart of waiting time processing for termination of an application.

FIG. 22 illustrates a flowchart of waiting processing for termination of an application. In the waiting processing for termination of an application, an active Java VM determines whether the state of a VM is "STANDBY" or "ABNORMAL" (S1501). When the state of a VM is "STANDBY" or "ABNORMAL" (YES in S1501), the active Java VM terminates the waiting processing for termination of an application.

When the state of a VM is not "STANDBY" or "ABNORMAL" (NO in S1501), the active Java VM obtains a start time of an application that has started last from among applications currently being executed, as "lastStartAppTime" (S1502). When the application that has started last terminates, "−1" is returned and the application is set to "lastStartAppTime".

While the flag is still "OFF" that is initially set or while "lastStartAppTime" is more than or equal to "0" (S1503), the active Java VM repeats the loop processing. For example, the active Java VM executes 1 second sleep (S1504), and obtains the start time of an application that has started last from among applications currently being executed, as "lastStartAppTime" (S1505).

In addition, the active Java VM determines whether the "lastStartAppTime" is "4", and the active Java VM determines whether the flag is "OFF" (S1506). In a case where the "lastStartAppTime" is "−1" and the flag is "OFF" (YES in S1506), the active Java VM sets dispatching as "OFF", and the flag is set as "ON" (S1507). In addition, the active Java VM executes 3 seconds sleep (S1508) and the processing exits the loop and terminates.

In addition, in a case where the "lastStartAppTime" is not "−1" and the flag is not "OFF" (No in S1506), the processing exits the loop and terminates when timeout elapses in the active Java VM (YES in S1509). In addition, the processing continues the loop when timeout does not elapse in the active Java VM (NO in S1509).

Figure 23:
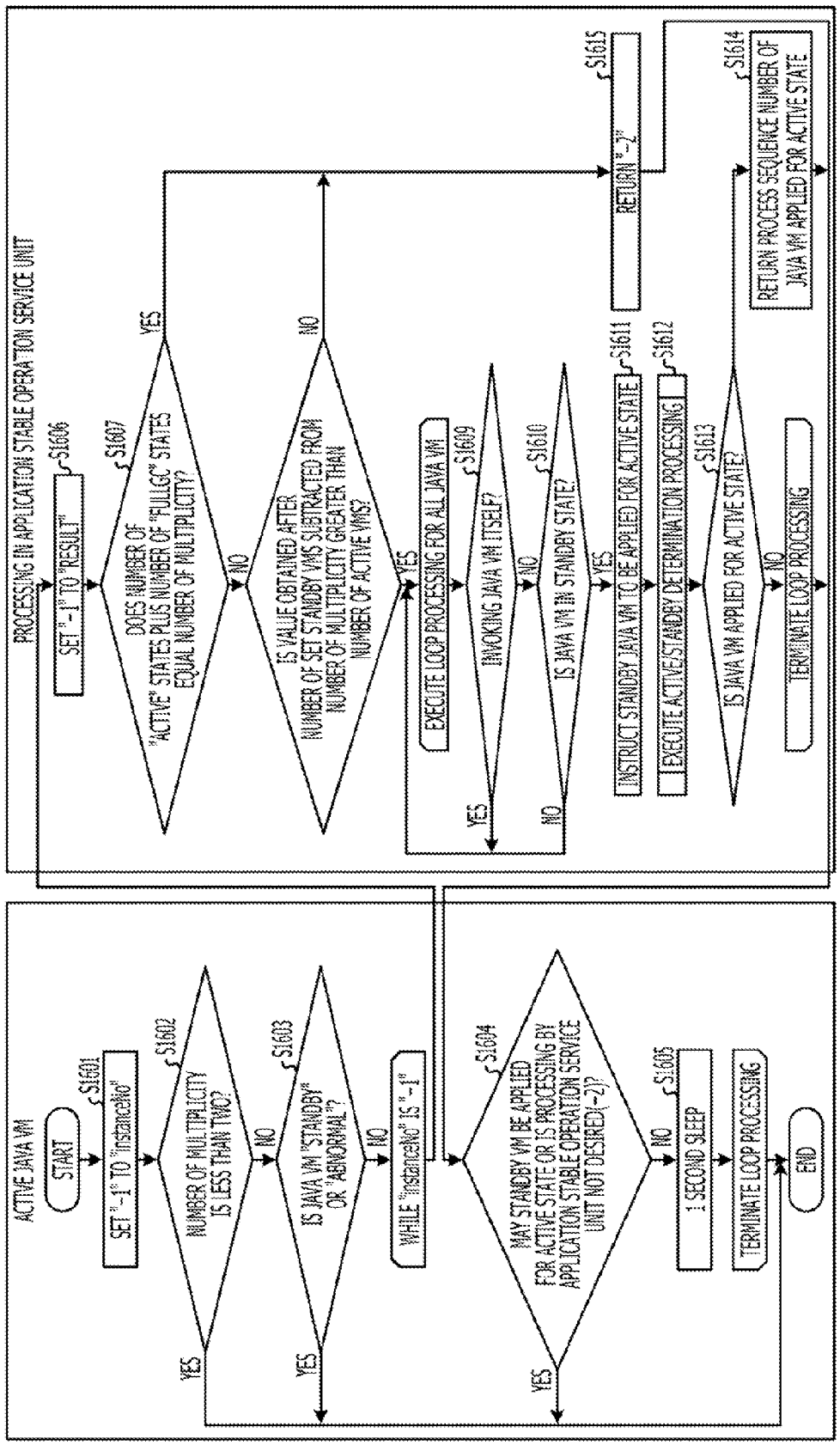
FIG. 23 illustrates a flowchart of operation request processing of a standby Java VM.

FIG. 23 illustrates a flowchart of operation request processing of a standby Java VM. When an active Java VM requests a standby Java VM to operate, the active Java VM sets "−1" to "instanceNo" (S1601). In addition, the active Java VM determines whether the number of multiplicity is less than two (S1602) and determines whether the state of a target Java VM applied for an active state is "STANDBY" or "ABNORMAL"

(S1603). When the number of multiplicity is less than two (YES in S1602) or when the state of the target Java VM applied for an active state is "STANDBY" or "ABNORMAL" (YES in S1603), the active Java VM terminates the processing.

When the number of multiplicity is not less than two (NO in S1602) and when the target Java VM applied for an active state is not "STANDBY" or "ABNORMAL" (NO in S1603), the active Java VM repeats to invoke the processing by the application stable operation service unit 92 while "instanceNo" is "−1". As a result, when a standby VM may be applied for an active state or when the processing by the application stable operation service unit 92 is not desired (YES in S1604), the active Java VM terminates the processing. When a standby VM may not be applied for an active state or when the processing by the application stable operation service unit 92 is desired (NO in S1604), 1 second sleep is executed (S1605), the loop processing is continued. When the processing exits the loop, the active Java VM terminates operation request processing of another standby Java VM.

The application stable operation service unit 92 sets "−1" to "result" (S1606), determines whether the number of "ACTIVE" states plus the number of "FULLGC" states equals the number of multiplicity (S1607). When the number of "ACTIVE" states plus the number of "FULLGC" states equals the number of multiplicity (YES in S1607), the application stable operation service unit 92 returns "−2" indicating that application for an active state is not desired for the active Java VM (S1615), and terminates the processing.

When the number of "ACTIVE" states plus the number of "FULLGC" states does not equal the number of multiplicity (NO in S1607), the application stable operation service unit 92 determines whether a value obtained after the number of set standby VMs is subtracted from the number of multiplicity is greater than the number of active VMs (S1608). When the value obtained after the number of set standby VMs is subtracted from the number of multiplicity is less than or equal to the number of current active VMs (NO in S1608), the application stable operation service unit 92 returns "−2" indicating that application for an active state is not desired for the active Java VM (S1615), and terminates the processing.

When the value obtained after the number of set standby VMs is subtracted from the number of multiplicity is greater than the number of active VMs (YES in S1608), the processing in Operation S1609 to S1613 enter a loop for all Java VMs in the application stable operation service unit 92.

That is, the application stable operation service unit 92 instructs to not invoke a Java VM (NO in S1609) but a Java VM in a "STANDBY" state (YES in S1610) to be applied for an active state (S1611). In addition, when the Java VM is applied for an active state (YES in S1613) by executing the active/standby determination processing illustrated in FIG. 15 (S1612), a process sequence number of the Java VM applied for an active state is returned (S1614), the processing terminates.

Figure 24:
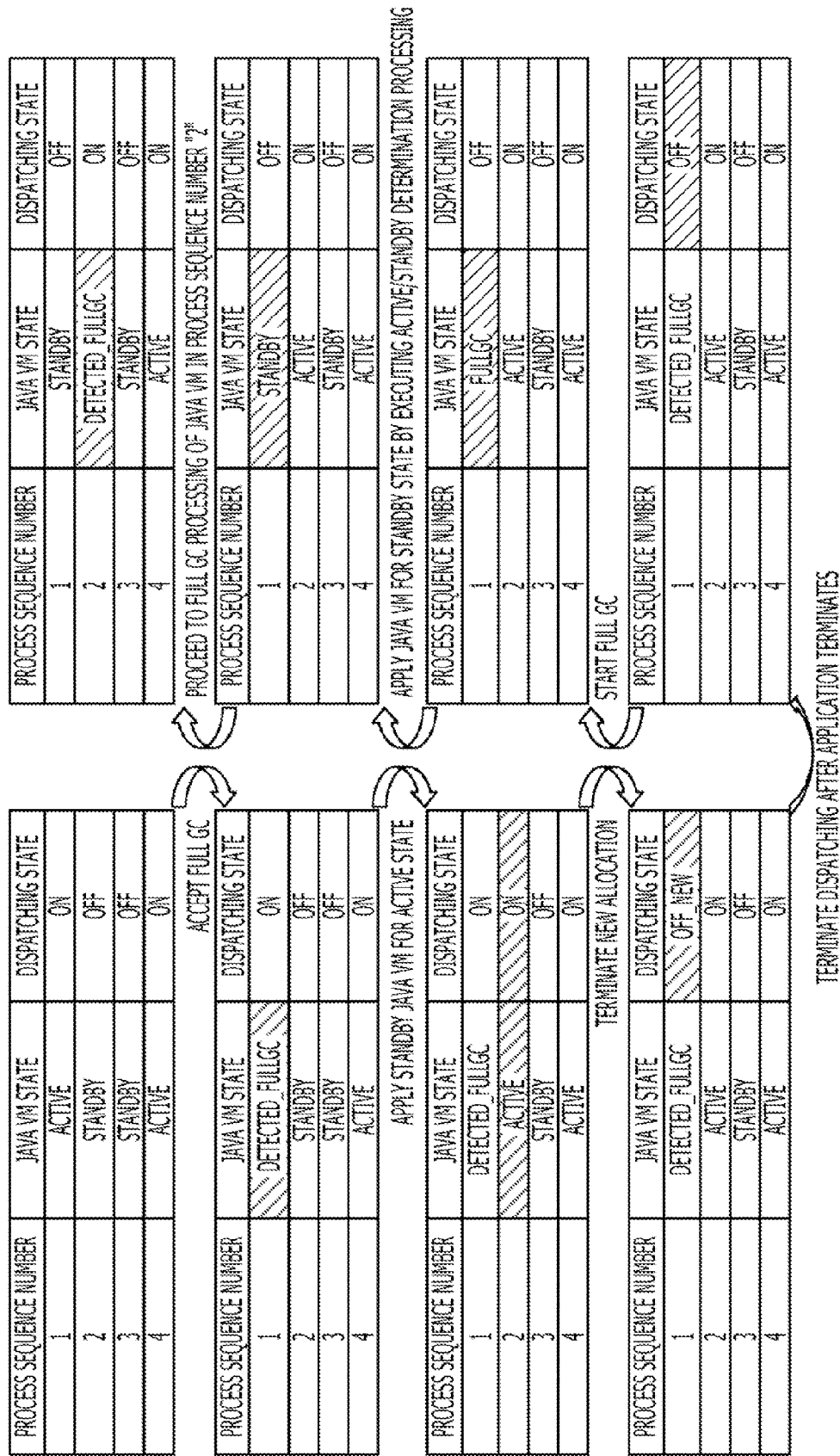
FIG. 24 illustrates a flowchart of transition of the Java VM state and a dispatching state when Full GC is executed.

FIG. 24 illustrates a flowchart of transition of the Java VM state and the dispatching state when the Full GC is executed. In FIG. 24, in the initial state, Java VM state "ACTIVE" and dispatching state "ON" are indicated with respect to process sequence number "1". In addition, Java VM state "STANDBY" and dispatching state "OFF" are indicated with respect to process sequence number "2". In addition, Java VM state "STANDBY" and dispatching state "OFF" are indicated with respect to process sequence number "3". In addition, Java VM state "ACTIVE" and dispatching state "ON" are indicated with respect to process sequence number "4".

In such state, when Full GC is accepted, the Java VM state in the process sequence number "1" becomes "DETECTED_FULLG" first. In addition, the process sequence number "2" that is in a standby state is applied for an active state, the Java VM state in the process sequence number "2" becomes "ACTIVE", and the dispatching state becomes "ON".

A new dispatching terminates with respect to the process sequence number "1", and the dispatching state in the process sequence number "1" becomes "OFF_NEW". In addition, the dispatching state in the process sequence number "1" becomes "OFF" by terminating the dispatching after the application terminates.

In addition, when Full GC starts in process sequence number "1", the Java VM state in process sequence number "1" becomes "FULLGC". After termination of the Full GC, the Java VM state in the process sequence number "1" is applied for a standby state by the active/standby determination processing, and the Java VM state in the process sequence number "1" becomes "STANDBY". The process proceeds to Full GC processing of the Java VM in the process sequence number "2".

Figure 25:
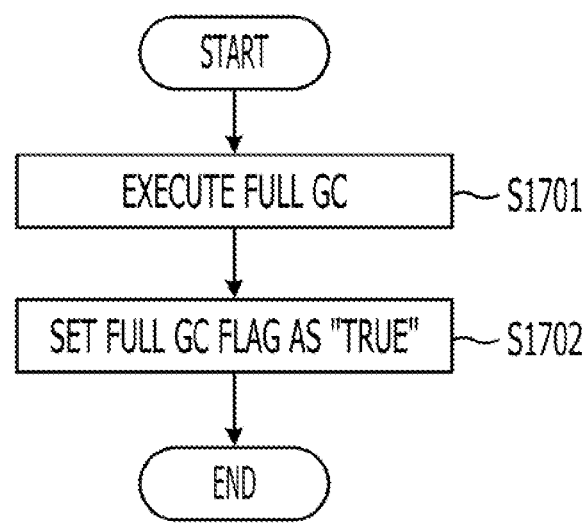
FIG. 25 illustrates a flowchart of Full GC processing when a standby Java VM is applied for an active state.

FIG. 25 illustrates a flowchart of the Full GC processing when a standby Java VM operates. For example, when Full GC is executed (S1701), a Full GC flag is set as "TRUE" (S1702). Generally, a Java VM is set so that Full GC is periodically executed, for example, once an hour. On the other hand, in the system according to the second embodiment, execution of Full GC is restricted so that a Java itself automatically does not execute the Full GC undesirably. In addition, even in a state such as "STANDBY" state that may not execute dispatching, Full GC is executed after a certain time period elapses because a resource such as Remote Method Invocation (RMI) is continued to be used when application for an active state is executed.

As described above, in the computing system 2 according to the second embodiment, a Java VM that accepts Full GC executes termination of merely new dispatching, waiting processing for termination of an application, and termination of dispatching. After that, execution of an application requested before and after the Full GC is accepted is assured.

Alternatively, another Java VM set as a standby VM may be applied for an active state instead of the Java VM that accepts Full GC. In addition, when two or more standby Java VMs exist, a Java VM applied for an active state may be determined, and Full GC may not be executed to a certain Java VM over and over. That is, Full GC is executed to a VM during standby, a Full GC flag is set as "TRUE", and Full GC executed when change from a standby state to an active state is executed may be skipped.

Thus, in the computing system 2 according to the second embodiment, the number of active Java VMs may keeps constant by starting up set Java VMs in a VM and setting one or more standby Java VMs even when Full GC is executed. In addition, in the execution of Full GC, when an application currently being processed exists, a Java VM stands by until the processing of the application is completed, and the processing is executed for each application by turns. As a result, throughput with respect to a request may not be reduced, and resource free up processing may be executed for all Java VMs desirably.

Thus, by the configuration and operations according to the second embodiment, load of application processing in the execution of GC may be reduced desirably.

All examples and conditional language recited herein are intended for pedagogical purposes to aid the reader in understanding the aspects of the invention and the concepts contributed by the inventor to furthering the art, and are to be construed as being without limitation to such specifically recited examples and conditions. Although the embodiment in accordance with aspects of the present invention has been described in detail, it should be understood that various changes, substitutions, and alterations could be made hereto without departing from the spirit and scope of the invention.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A computing system comprising:
   a plurality of computing machines; and
   a load balancer configured to allocate computing processing to the plurality of computing machines,
   the plurality of computing machines executes the allocated computing processing,
   each of the plurality of computing machines includes:
   a processor configure to:
   receive an event;
   directly request another computing machine to switch from a standby state to an active state when a received event instructs to execute one of garbage collection and restart of a computing machine that receives the event and the computing machine receives a response for informing the standby state of the another computing machine from the another computing machine; and start one of the garbage collection and the restart of the computing machine, after the another computing machine switches to an active state in response to the request, wherein the garbage collection is managed based on an identifier that identifies whether a memory area, from among memory areas allocated to the computing machine while the computing machine is in the active state and is no longer in use, is deallocated, and the processor is configured to determine, based on the identifier, whether the received event is executed.

2. The computing system according to claim 1, wherein the plurality of computing machines are virtual machines and allowed to be executed in a physical computing machine.

3. The computing system according to claim 1, wherein the load balancer receives one of notification indicating termination of dispatching of computing processing and notification indicating start of dispatching of computing processing from the plurality of computing machines, and executes the dispatching of computing processing to the computing machine that notifies the notification indicating start of dispatching.

4. A computing system management method of executing computing processing by a plurality of computers, the computing system management method causing each of the plurality of computers to execute:
   receiving an event in one of the plurality of computers;
   directly requesting another computer to switch, when the received event instructs to execute one of garbage collection and restart of a computer that receives the event and the computer receives a response for informing a standby state of the another computing machine from the another computing machine, from the standby state to an active state; and starting one of the garbage collection and the restart of the computer that receives the event, after the another computer switches to an active state in response to the requesting, wherein the garbage collection is managed based on an identifier that identifies whether a memory area, from among memory areas allocated to the computing machine while the computing machine is in the active state and is no longer in use, is deallocated, and the processor is configured to determine, based on the identifier, whether the received event is executed.

* * * * *